United States Patent
Wakabayashi et al.

[19]

[11] Patent Number: 5,845,535
[45] Date of Patent: Dec. 8, 1998

[54] GEARSHIFT APPARATUS FOR A VEHICLE

[75] Inventors: Hideaki Wakabayashi, Aichi-ken; Mineo Hirano, Tokyo; Yasuo Torii, Tokyo; Yasuhiro Sato, Tokyo, all of Japan

[73] Assignees: Mitsubishi Jidosha Kogyo Kabushiki Kaisha; Niles Parts Co, Ltd., both of Tokyo, Japan

[21] Appl. No.: 775,890

[22] Filed: Jan. 2, 1997

[30] Foreign Application Priority Data

Jan. 11, 1996 [JP] Japan .................................. 8-003076

[51] Int. Cl.⁶ .............................. F16H 59/02; F16H 63/38
[52] U.S. Cl. ..................... 74/473.18; 74/335; 74/473.27; 74/527; 200/61.88
[58] Field of Search ................................ 74/335, 473.18, 74/473.27, 527; 200/61.88

[56] References Cited

U.S. PATENT DOCUMENTS

| | | | |
|---|---|---|---|
| 3,292,450 | 12/1966 | Hurst et al. ........................... | 74/473.18 |
| 4,987,792 | 1/1991 | Mueller et al. ......................... | 74/335 X |
| 5,070,740 | 12/1991 | Giek et al. ............................. | 74/355 X |
| 5,205,180 | 4/1993 | Moroto et al. ......................... | 74/335 X |
| 5,622,079 | 4/1997 | Woeste et al. ......................... | 74/475 X |
| 5,682,789 | 11/1997 | DeCrouppe et al. ................. | 74/475 X |
| 5,689,996 | 11/1997 | Ersoy ..................................... | 74/475 X |

FOREIGN PATENT DOCUMENTS

| | | |
|---|---|---|
| 331797 | 9/1989 | European Pat. Off. . |
| 0575658 | 12/1993 | European Pat. Off. . |
| 2-8545 | 1/1990 | Japan . |
| WO95/35456 | 12/1995 | WIPO . |

*Primary Examiner*—Allan D. Herrmann
*Attorney, Agent, or Firm*—John P. White; Cooper & Dunham LLP

[57] ABSTRACT

A gearshift apparatus having a shift lever is constructed so that the transmission stage can be set or changed by manual operation when the shift lever is moved from a main gate for an automatic transmission mode to a manual gate for a manual transmission mode through a transit gate. The apparatus comprises a detent unit attached to the body of a vehicle. The unit contains a moving member for selection therein. The moving member moves integrally with the shift lever when the lever moves in the transit gate. When the lever moves in the main gate or the manual gate, the moving member never follows the motion of the lever. The detent unit is provided with a retaining mechanism for producing a retaining force for retaining the shift lever and a click feeling at either end of the transit gate as the lever moves along the transit gate. The shift lever has a simple construction, although it is provided with all necessary functions for the change between the automatic and manual transmission modes.

10 Claims, 18 Drawing Sheets

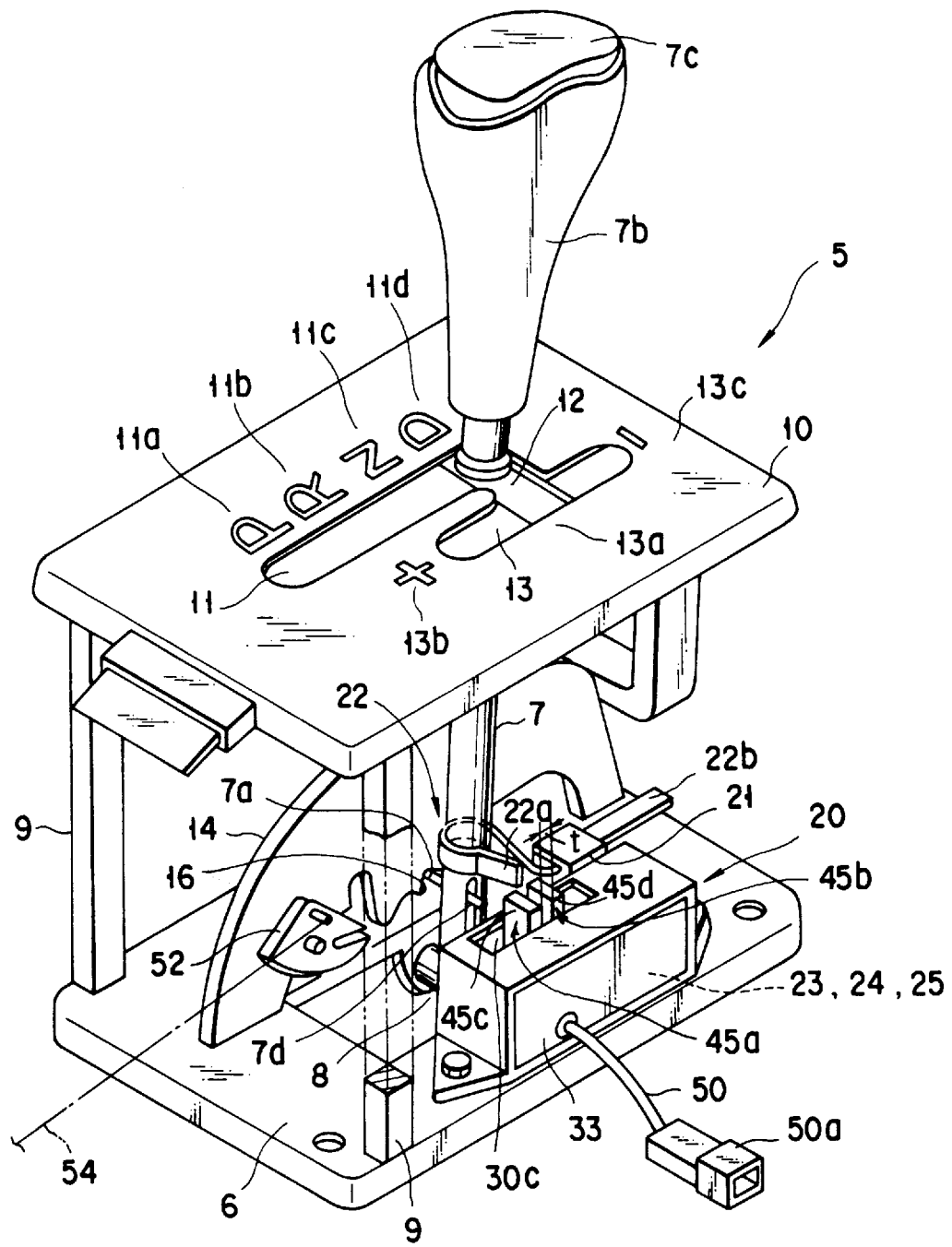
F I G. 2

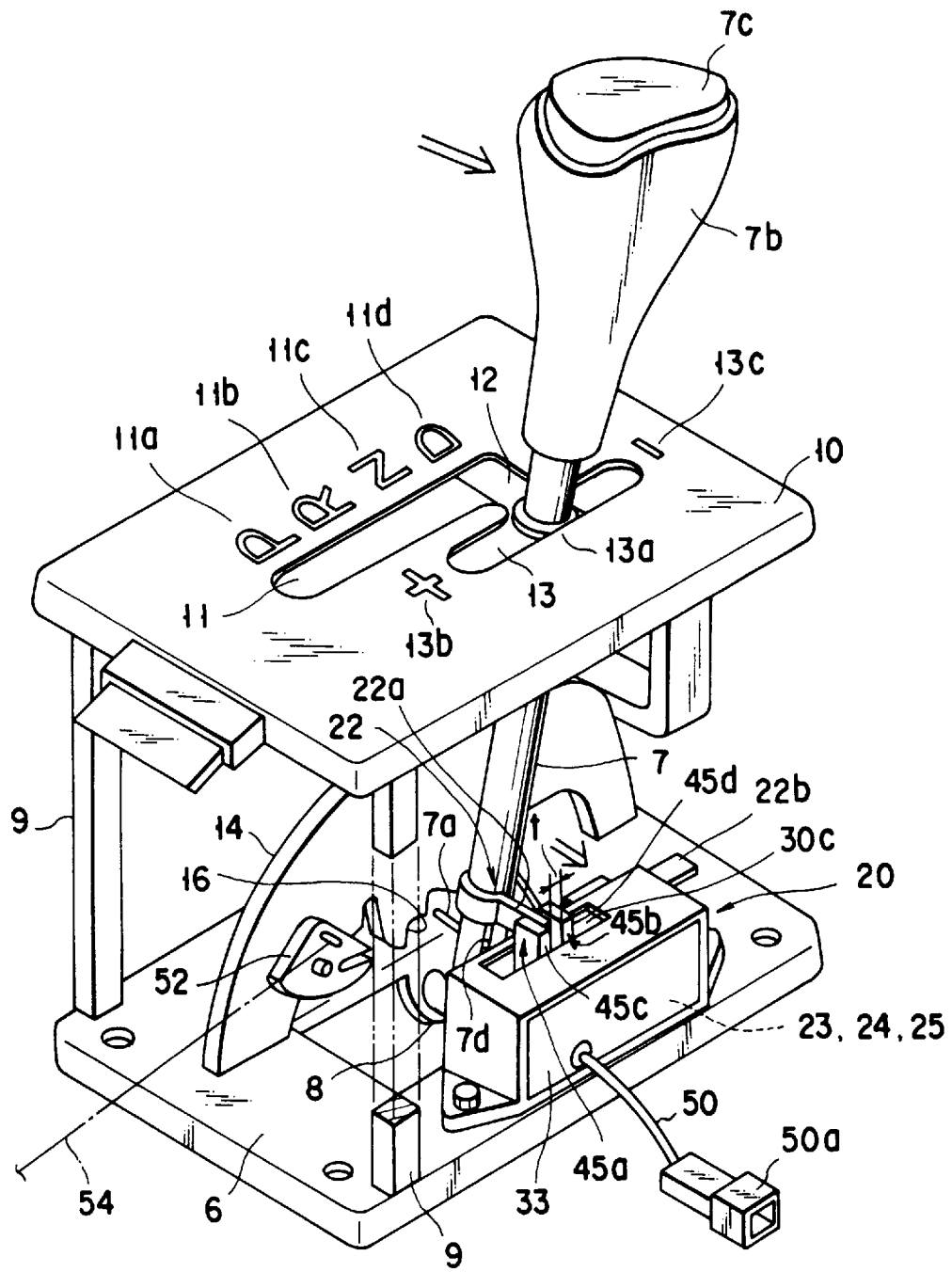
F I G. 3

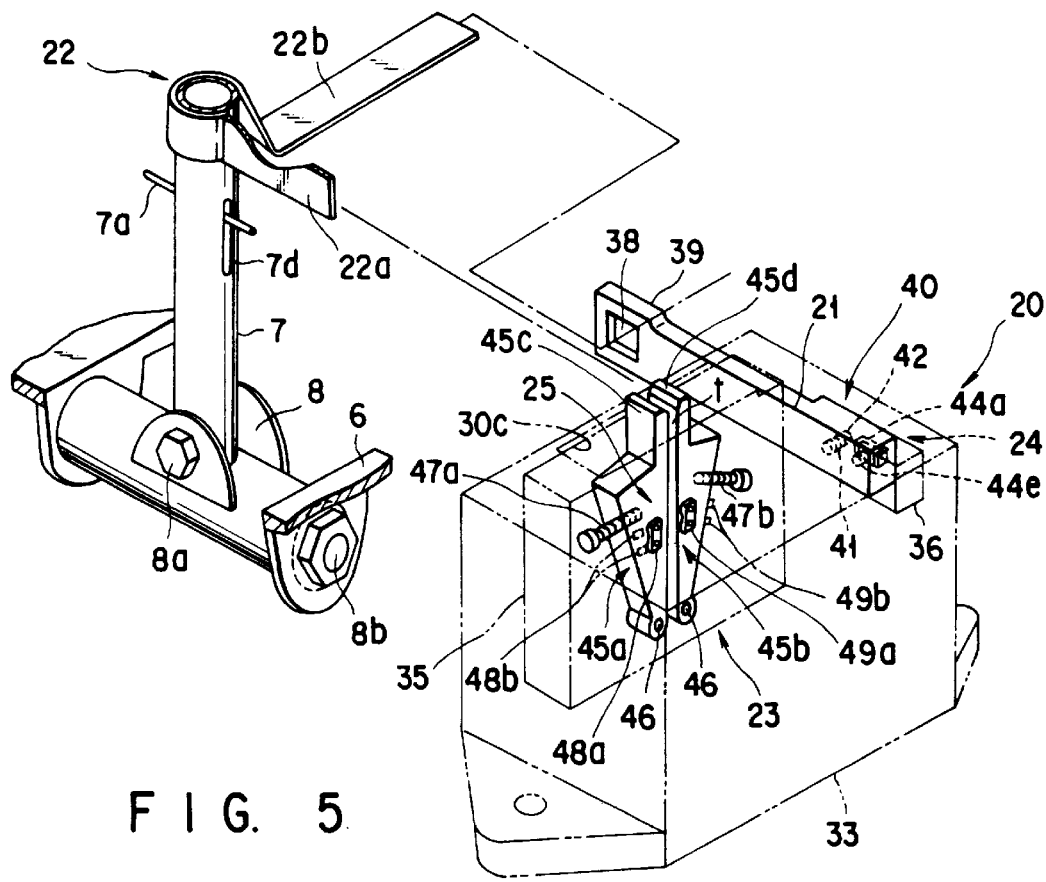
F I G. 5
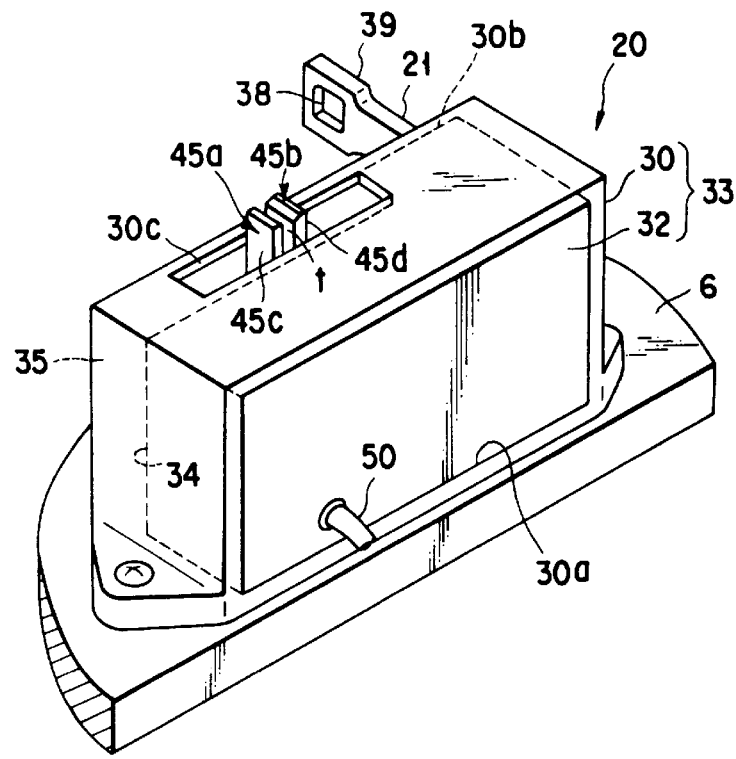
F I G. 6

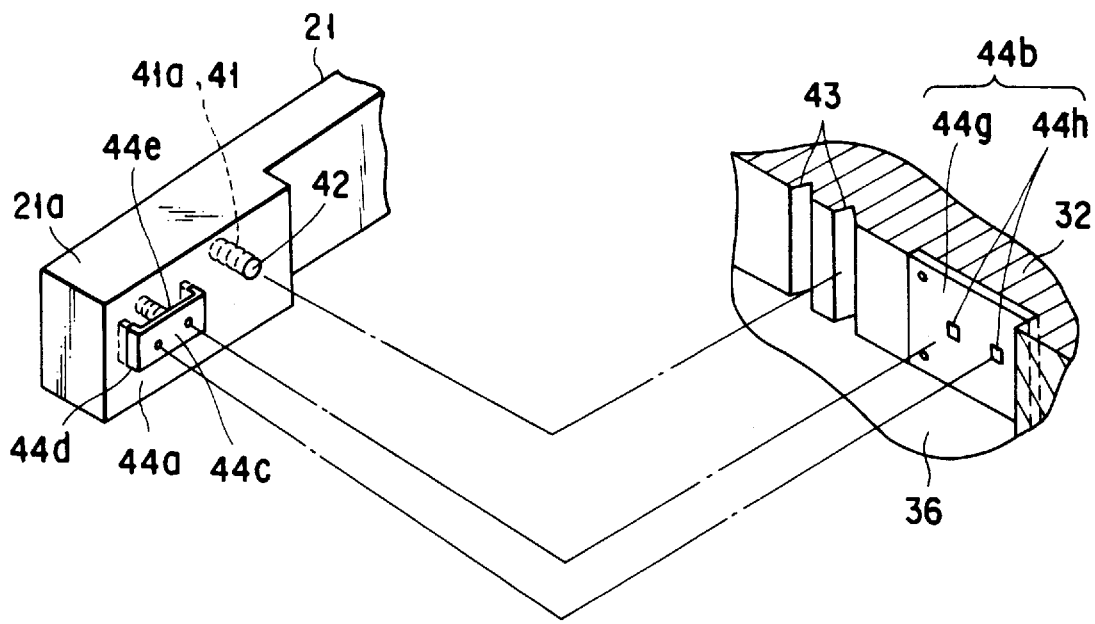
F I G. 9A
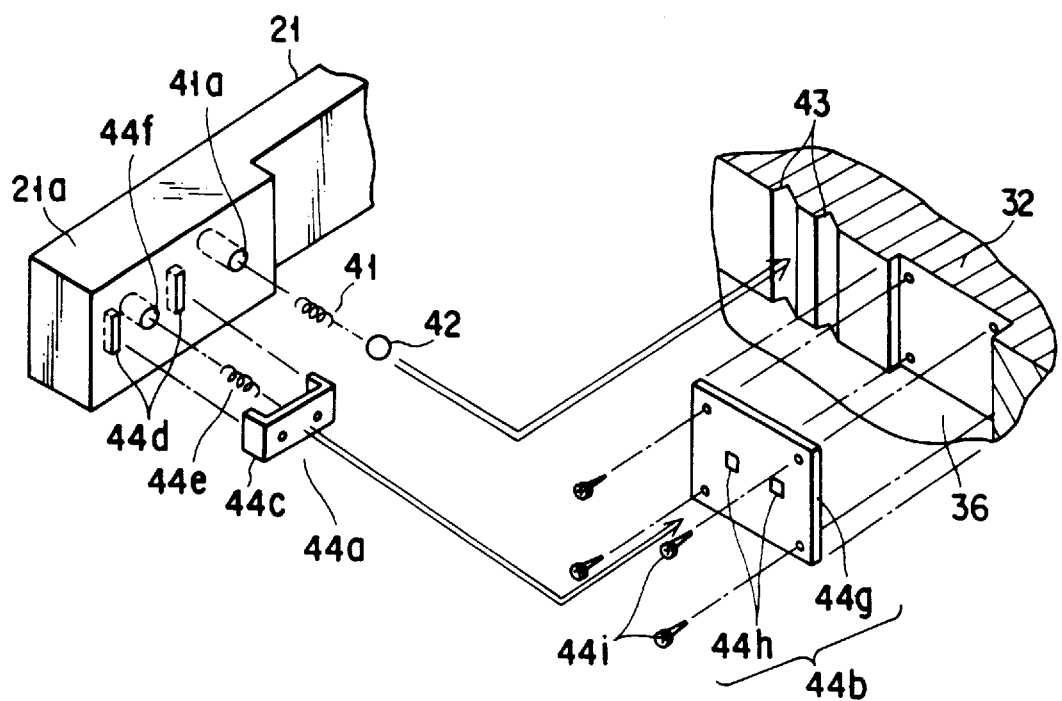
F I G. 9B

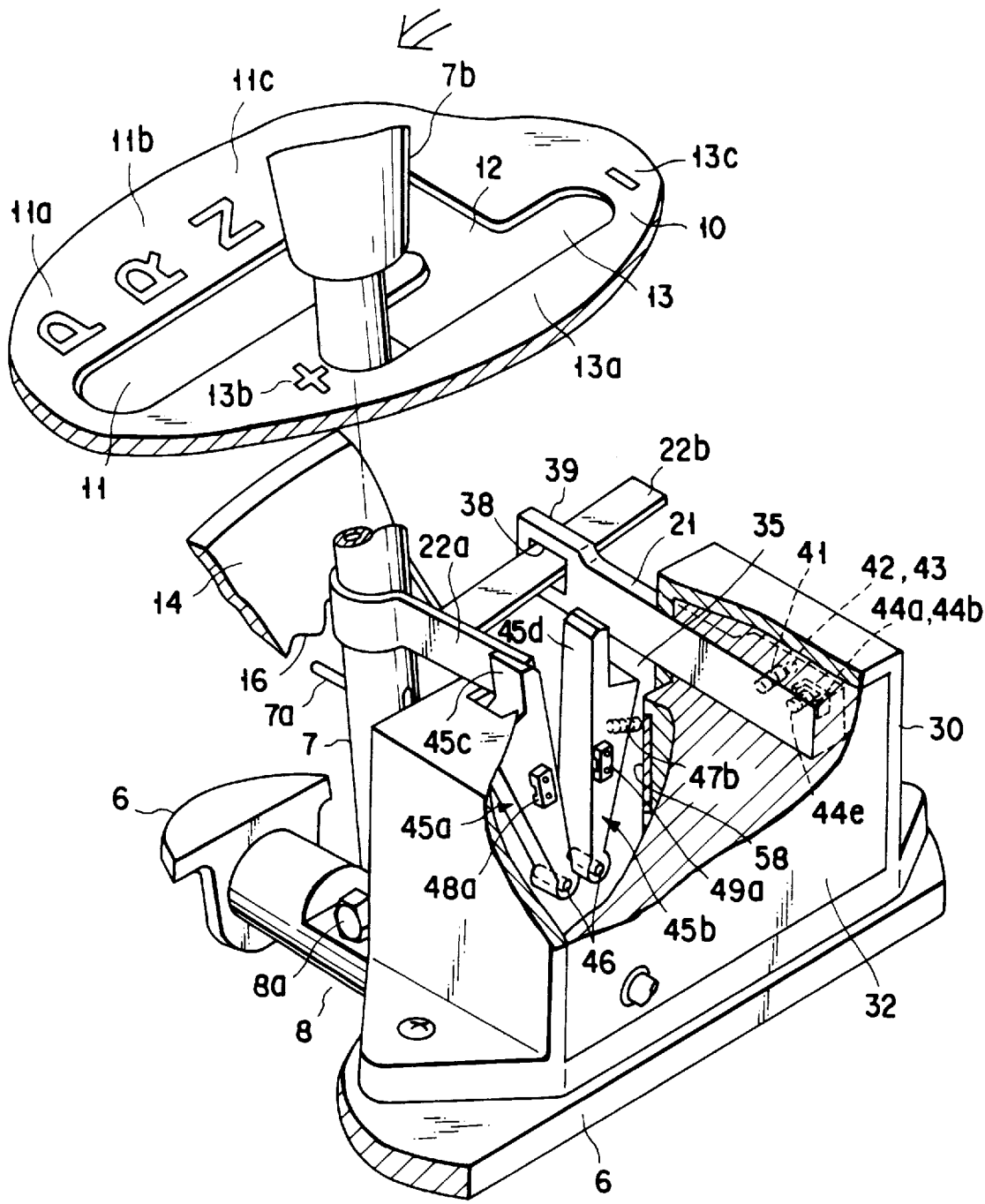
F I G. 12

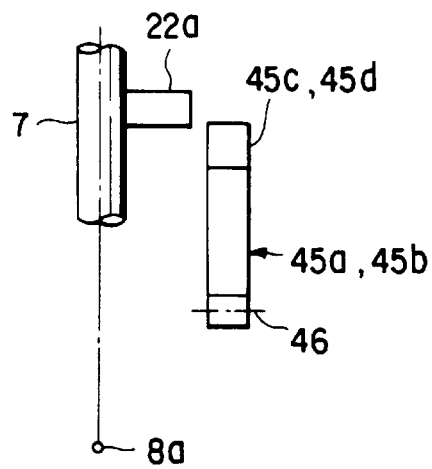
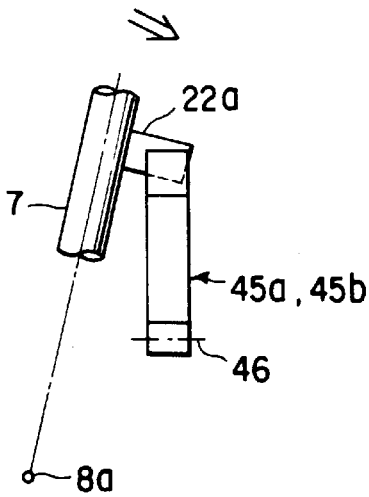
FIG. 13A
FIG. 13B
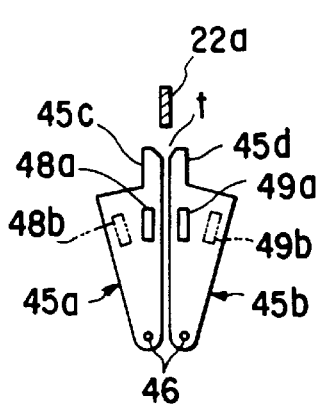
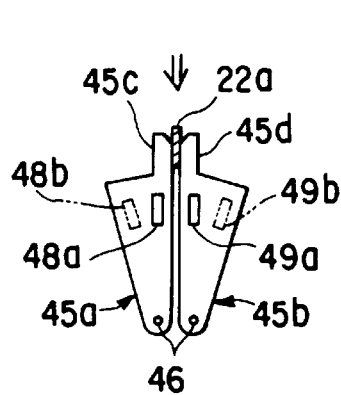
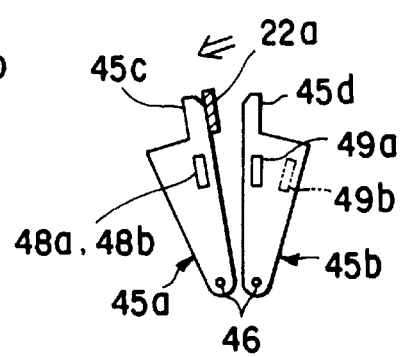
FIG. 13C
FIG. 13D
FIG. 13E

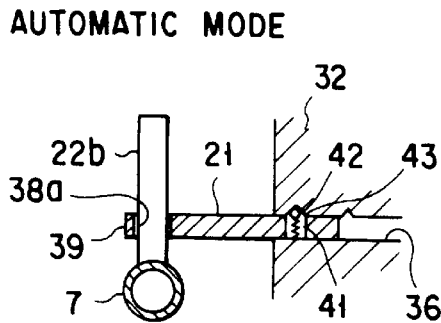
F I G. 14 A  AUTOMATIC MODE
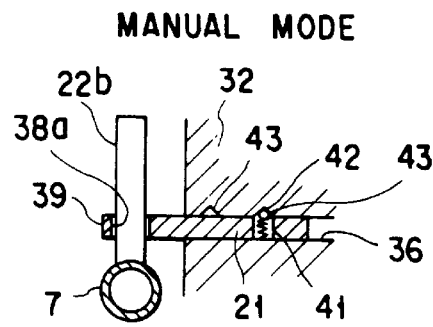
F I G. 14 B  MANUAL MODE
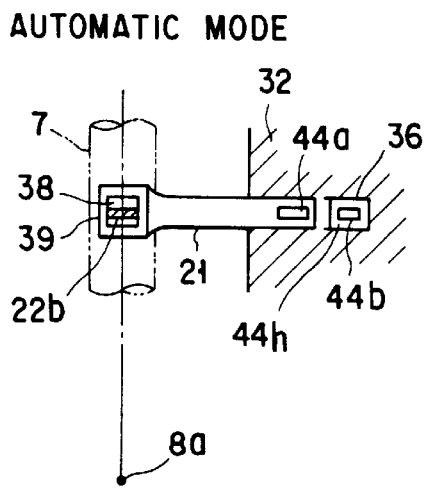
F I G. 14 C  AUTOMATIC MODE
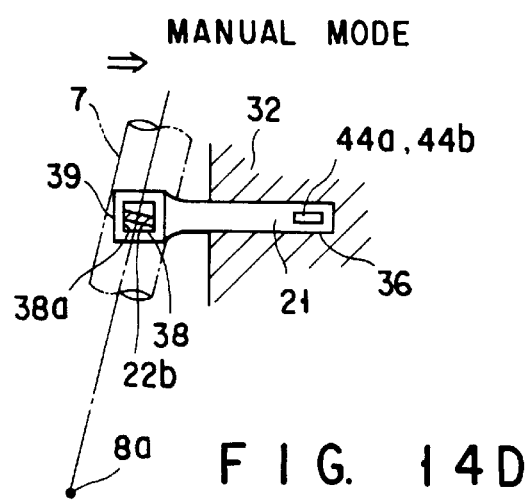
F I G. 14 D  MANUAL MODE
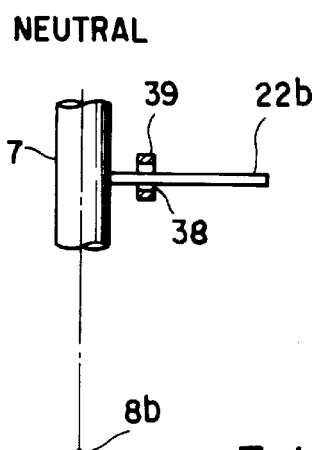
F I G. 14 E  NEUTRAL
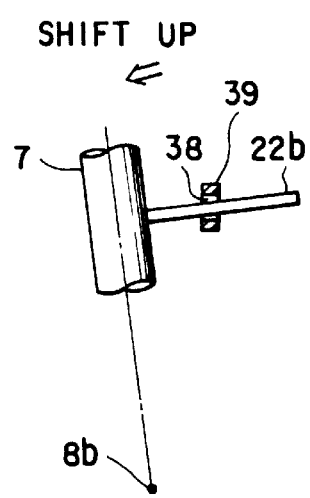
F I G. 14 F  SHIFT UP

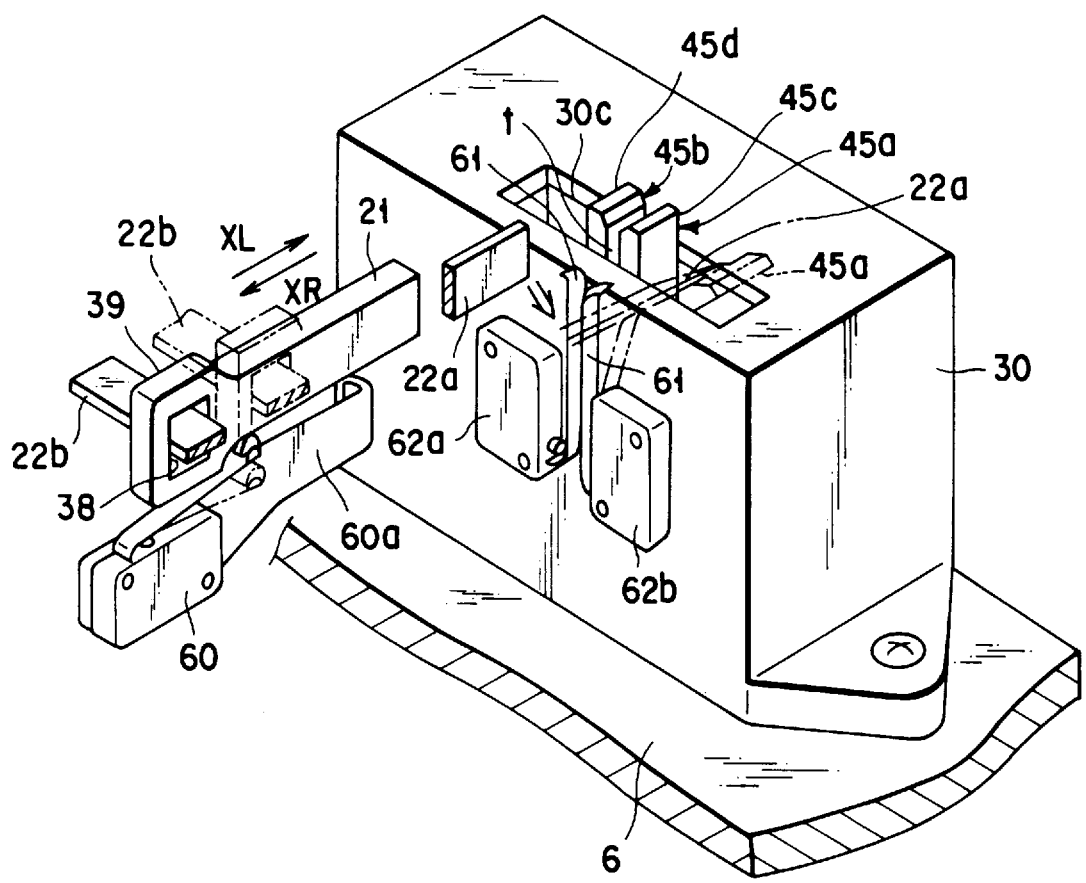
F I G. 15

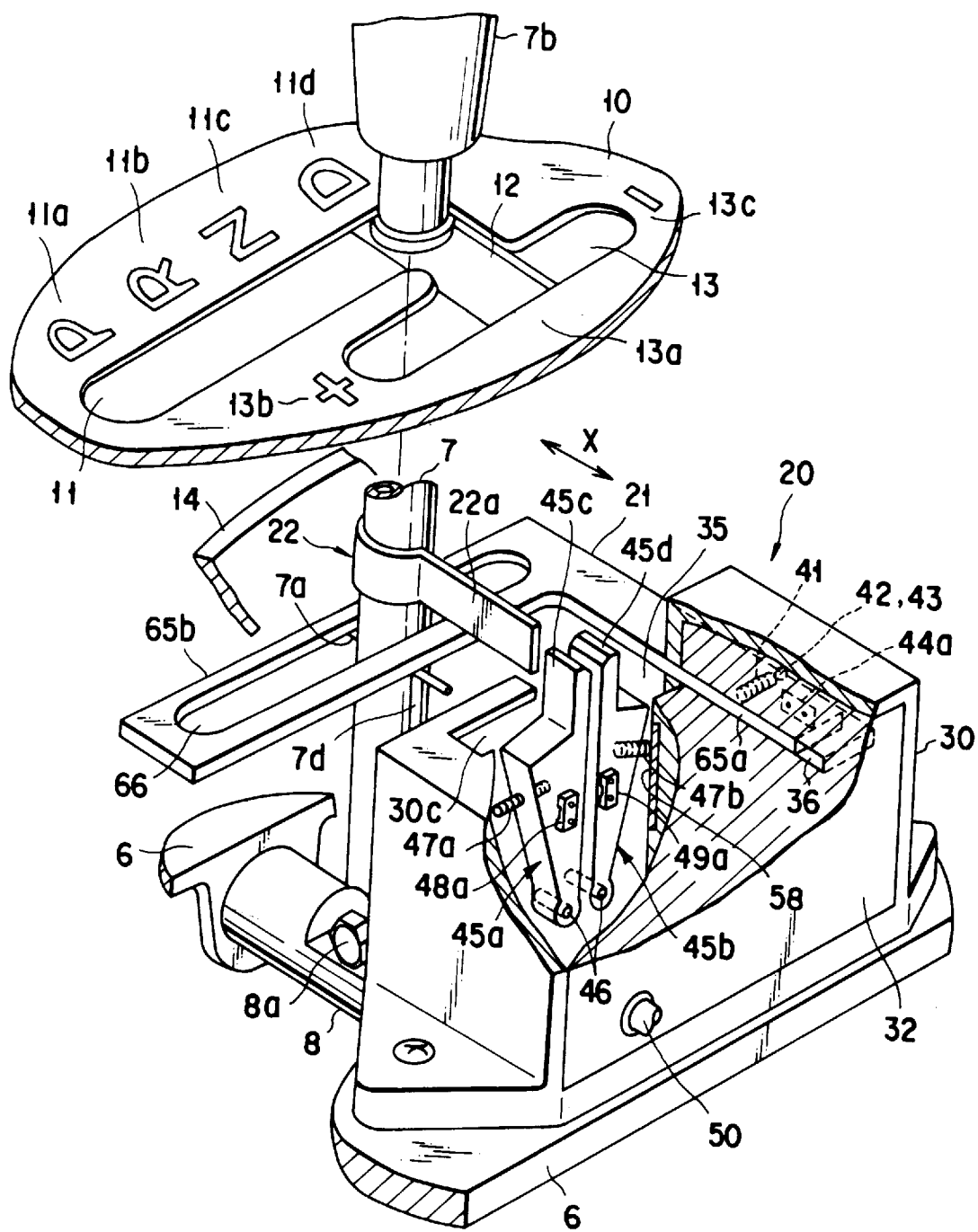
F I G. 16

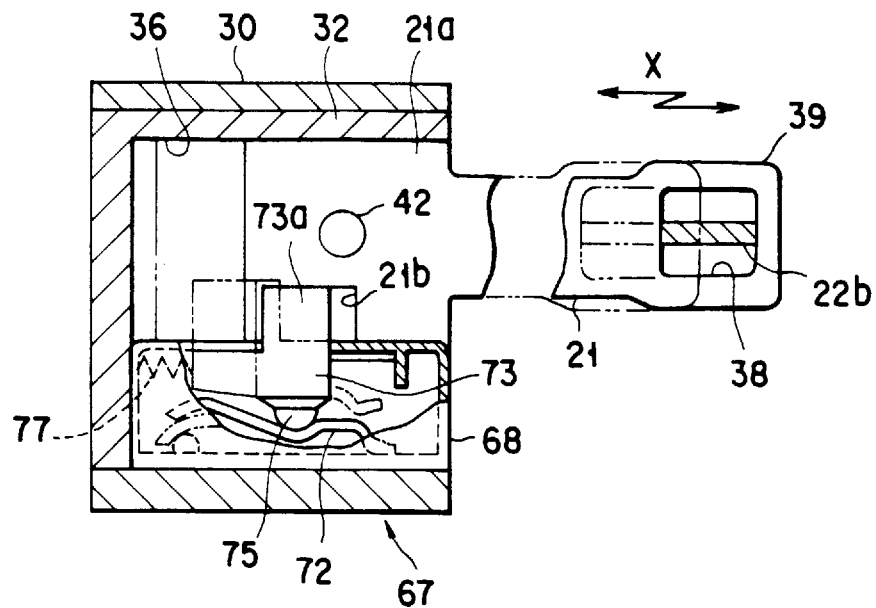
F I G. 18
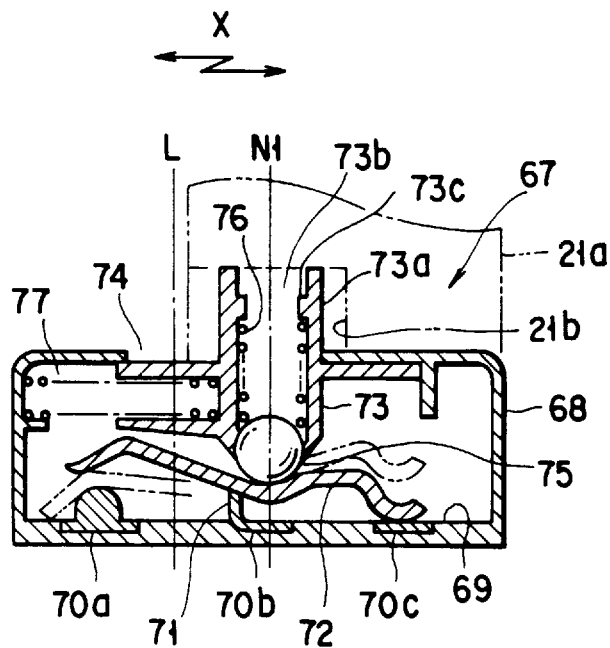
F I G. 19

GEARSHIFT APPARATUS FOR A VEHICLE

BACKGROUND OF THE INVENTION

The present invention relates to a gearshift apparatus for an automatic vehicular speed change gear capable of selecting the transmission stage by the same shift operation for a manual speed change gear.

A gearshift apparatus is a known system adapted for use in an electronically-controlled automatic speed change gear that is mounted in a vehicle, such as a passenger car. This apparatus has a function to allow the transmission stage to be held in a desired position by manual operation in order to stabilize a drive on a snow-covered road or secure engine braking, as well as the automatic transmission function based on a predetermined transmission mode. Some modern automatic speed change gears for passenger cars are furnished with a gearshift apparatus that permits shift operation similar to that for a manual speed change gear. As shown in FIGS. 20A and 20B, the gearshift apparatus of this type is provided with a first gate 100 for an automatic transmission mode, in which a plurality of shift positions, such as P (parking), R (reverse), N (neutral), D (drive), etc., are arranged successively in a straight line in the longitudinal direction of the vehicle body. Further, this gearshift apparatus is provided with a third gate 101 for a manual transmission mode, which extends parallel to the first gate 100, and a second gate 102 connecting the middle portion of the gate 101 and the D-position in the gate 100. A penetrating shift lever 103 is movable in these gates 100 to 102. The shift lever 103 is supported by shafts 105 and 106 for movement along the gates 100 to 102.

In the gearshift apparatus described above, the transmission stage can be selected with the same feeling obtained with use of a manual shift lever, by transferring the shift lever 103 from the first gate 100 to the neutral position in the third gate 101 via the second gate 102, and then moving the shift lever 103 to a change-up position on the front side or a change-down position on the rear side. This gearshift apparatus is furnished with a detent mechanism 104 in order to keep the shift lever 103 on the automatic or manual transmission mode side and to obtain a click feeling when the shift lever 103 is shifted between the two transmission modes. The click feeling stated herein is a feeling in a driver's hand that the shift lever 103 is switched to a desired position as the necessary force for the operation of the shift lever 103 is changed the moment the shift lever 103 reaches that position.

Examples of the detent mechanism 104 are described in Jpn. Pat. Appln. KOKAI Publication No. 2-8545, EP No. 331,797, and U.S. Pat. No. 4,987,792. In these conventional cases, the whole detent mechanism is attached integrally to the shift lever 103. FIG. 20B shows a specific arrangement of the mechanism. Referring to FIG. 20B, the lower part of the shift lever 103 is supported by two shafts 105 and 106 so as to be rockable in the longitudinal direction of the vehicle body, a shifting direction, and the vehicle width direction, a selecting direction. The shift lever 103 is connected with a linkage member 107, which is located beside the shift lever 103 and is rockable in both the selecting and shifting directions. The member 107 extends downward along the shift lever 103. A leaf spring 108 protrudes from the lower end portion of the linkage member 107 toward the lower end of the shift lever 103. The distal end portion of the spring 108 is upwardly convex in shape and faces the lower end of the shift lever 103. At the lower end of the shift lever 103, a ball 100 is supported by an arcuate section 109 of the spring 108. When the shift lever 103 is in the gate 100, the ball 110 is elastically supported by the leaf spring 108 at the proximal portion of the arcuate section 109. When the shift lever 103 is in the gate 101, on the other hand, the ball 110 is elastically supported by the spring 108 at the distal end portion of the arcuate section 109.

The detent mechanism 104 is designed so that a click feeling is produced by a reaction force from the leaf spring 108 that is generated as the ball 110 gets over the arcuate section 109 when the shift lever 103 is operated for movement in the transverse direction. Thus, the shift lever 103 is elastically held in a position for the automatic or manual transmission mode by means of the leaf spring 108, as indicated by full or two-dot chain line in FIG. 20B. The click feeling is produced when the deflection of the spring 108 changes as the ball 110 gets over the arcuate section 109 during the shift of the shift lever 103 to the automatic or manual transmission mode (or movement from the gate 100 to the gate 101 or reverse movement).

The detent mechanism 104 of the gearshift apparatus is expected to have a simple construction and not to exert a bad influence upon the operation of the shift lever 103. In the case of an arrangement such that the detent mechanism 104 is attached integrally to the shift lever 103, however, the linkage member 107, which moves together with the shift lever 103, must be provided integrally with the shift lever 103. Besides, a retaining mechanism (including the leaf spring 108, ball 110, etc.) for holding the shift lever 103 at either end of the gate 102, that is, on the side of the gate 100 or 101, must be provided between the linkage member 107 and the shift lever 103. Therefore, the construction of the shift lever 103 is liable to be complicated. Furthermore, the components of the detent mechanism 104 move together with the shift lever 103 during the shift operation in the automatic or manual transmission mode. Accordingly, moving the shift lever 103 along the gate 100 or 101 requires a great operating force. Thus, the controllability of the shift lever 103 in the automatic and manual transmission modes easily worsens.

BRIEF SUMMARY OF THE INVENTION

Accordingly, the object of the present invention is to provide a gearshift apparatus for a vehicle, in which a click feeling from a shift lever during mode change between automatic and manual transmission modes and the retaining function of the shift lever can be secured without failing to simplify the construction of the shift lever and improve the controllability of the shift lever in the automatic and manual transmission modes.

In order to achieve the above object, according to the present invention, there is provided a gearshift apparatus for a vehicle, in which gate means for guiding the movement of a shift lever rockably supported on the body of the vehicle includes a first gate having a plurality of shift positions, including an automatic transmission position in which the transmission stage of the speed change gear is changed automatically in accordance with the driving conditions of the vehicle, a second gate having one end connected to the first gate and the other end and extending in a direction different from the extending direction of the first gate, and a third gate connected to the other end of the second gate and extending in a direction different from the extending direction of the second gate. When the shift lever is situated in one of the shift positions in the first gate, the transmission stage corresponding to that position is set or changed. The gearshift apparatus comprises a linkage member movably supported by supporting means attached to the vehicle body and capable of engaging the shift lever so as to move integrally with the shift lever when the shift lever moves along the second gate and be freed from the movement of the shift lever when the shift lever moves along the first or third gate, and retaining means provided between the supporting means and the linkage member and adapted to generate a retaining force for retaining the shift lever at the one and the other end of the second gate as the shift lever moves along the second gate.

According to the present invention, the shift lever situated on the one end side of the second gate is held there as the retaining force generated by the retaining means attached to a base member or the like is transmitted to the linkage member. When the shift lever is moved along the first gate in order to select one of the shift positions set in the first gate, the shift lever moves independently of the linkage member in the first gate. When the shift lever is operated so as to move from the one end of the second gate toward the other end in order to select one of the shift positions set in the third gate, on the other hand, the lever then goes toward the other end of the second gate while moving together with the linkage member in the second gate. Also at the other end of the second gate, the shift lever is held in position by the retaining force generated by the retaining means. The development of the retaining force produces a click feeling during mode change between automatic and manual transmission modes. When the shift lever shifted to the manual transmission mode is operated for movement along the third gate, it moves independently of the linkage member in the third gate, as in the automatic transmission mode. Accordingly, the click feeling from the shift lever during the mode change between the automatic and manual transmission modes and the retaining function of the shift lever can be secured without providing the shift lever with any retaining mechanism, that is, with use of a simple shift lever. The linkage member is constructed separately from the shift lever, and is independent of the motion of the shift lever moving in the first or third gate. Since the retaining force from the retaining means is applied to the linkage member, the lever operation in the automatic or manual transmission mode cannot be influenced by the weight of the linkage member or the like. In consequence, the controllability of the shift lever in the automatic and manual transmission modes is improved.

Thus, according to the invention, the click feeling and the retaining performance of the shift lever, engaged in the change between the automatic and manual transmission modes, can be ensured without providing the shift lever itself with any retaining mechanism. As a result, the structure of the shift lever can be simplified, and the reliability of the shift lever can be improved. Since the linkage member for transmitting the retaining force is free from the motion of the shift lever moving in the first or third gate, moreover, the lever operation in the automatic or manual transmission mode cannot be influenced by the weight of the linkage member or the like. Accordingly, the operating force of the shift lever for the automatic and manual transmission modes can be reduced, so that the controllability of the shift lever in each mode can be improved.

Preferably, the first and third gates extends substantially parallel to each other, and the second gate extends substantially at right angles to the first and third gates. In the vehicular gearshift apparatus having the first and third gates thus extending parallel to each other, the linkage member preferably has a hole or groove extending corresponding to the moving direction of the shift lever in the first and third gates. Also, the shift lever preferably includes an operating member, such as an arm, that is fitted in the hole or groove and causes the linkage member to move along the second gate by abutting against the wall surface of the hole or groove as the shift lever moves in the second gate.

In the vehicular gearshift apparatus having the first and third gates extending parallel to each other, moreover, the linkage member may be formed having a slot opening in the axial direction of the shift lever and extending in the moving direction of the lever in the first and third gates so that the shift lever is inserted in the slot. In this arrangement, the linkage member is moved along the second gate so that the shift lever abuts against the inner wall surface of the slot as the shift lever moves in the second gate. In this vehicular gearshift apparatus having the first and third gates extending parallel to each other, the linkage member having the hole or groove in engagement with the shift lever and the operating member attached to the shift lever are used in a manner such that the shift lever can be caused to abut against the inner wall surface of the hole or groove, thereby moving the linkage member along the second gate, as the shift lever moves in the second gate. Alternatively, the linkage member may be formed having a hole penetrated by the shift lever and extending along the first and third gates. In this arrangement, the shift lever is caused to abut against the inner wall surface of the hole so that the linkage member can move along the second gate only when the lever moves in the second gate. These arrangements can fulfill a high-reliability detent function.

In order to improve the controllability of the shift lever in the manual transmission mode, according to the invention, a neutral position corresponding to the other end of the second gate is set in the third gate, a first shift position is set on one side of the third gate with respect to the neutral position, and a second shift position is set on the other side. Also, the supporting means includes second retaining means adapted to hold the shift lever in the neutral position or the first or second shift position by engaging a shift lever-side member when the shift lever moves in the third gate. According to this arrangement, the aforementioned effects of the invention can be ensured, and besides, a driver can easily recognize the position of the shift lever in the third gate through a feeling in his hand, so that the controllability of the shift lever in the manual transmission mode can be improved.

In order to reduce the operating force of the shift lever and maintain the neutrality of the shift lever in the neutral position in the manual transmission mode, according to the invention, moreover, the second retaining means includes first urging means for urging the shift lever toward the neutral position by engaging the shift lever-side member between the neutral position and the first shift position, and second urging means for urging the shift lever toward the neutral position by engaging the shift lever-side member between the second shift position and the neutral position. According to this arrangement, the aforementioned effects of the invention can be ensured, and besides, the moment of inertia of the shift lever in the third gate can be reduced, so that the operating force of the shift lever can be lessened, and the neutrality of the shift lever in the manual transmission mode can be maintained.

In order to facilitate the attachment of the gearshift apparatus to the vehicle body and the replacement of the apparatus, according to the invention, the supporting means is composed of a detent unit mounted on a gearshift base that is attached to the vehicle body. The detent unit includes shift detecting means, adapted to deliver a change-up signal when the shift lever in the third gate is moved to the first shift position and deliver a change-down signal when the shift lever is moved to the second shift position, and mode detecting means for determining whether the shift lever is in the automatic transmission mode or in the manual transmission mode in accordance with the position of the linkage member. According to this arrangement, the aforementioned effects of the invention can be ensured, and besides, the gearshift apparatus can be attached to the vehicle body and replaced with ease, so that the operating efficiency is improved. If switches that constitute the shift and mode detecting means are contained in the detent unit, moreover, there is no possibility of the switches being damaged during the attachment of the gearshift apparatus to the vehicle body.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a perspective view showing the external appearance of the gearshift apparatus of FIG. 1 with its shift lever in a D-position;

FIG. 3 is a perspective view showing the shift lever of the gearshift apparatus moved from the D-position to a neutral position for a manual transmission mode;

FIG. 5 is a perspective view showing an outline of a detent unit constructed separately from the shift lever of the gearshift apparatus;

FIG. 6 is a perspective view showing the external appearance of the detent unit of FIG. 5;

FIG. 9A is a perspective view showing an arrangement of a mode switch system of the detent unit;

FIG. 9B is an exploded perspective view of the mode switch system shown in FIG. 9A;

FIG. 12 is a perspective view showing the detent unit with the shift lever in the change-up position;

FIGS. 13A and 13B are side views showing the way an arm for shifting behaves as the shift lever shifts from an automatic transmission mode to the manual transmission mode;

FIGS. 13C, 13D and 13E are front views showing the behavior of the arm for shifting shown in FIG. 13A;

FIGS. 14A and 14B are cross-sectional views showing the way a moving member for selection behaves as the shift lever shifts from the automatic transmission mode to the manual transmission mode;

FIGS. 14C and 14D are front views showing the behavior of the moving member for selection shown in FIG. 14A;

FIGS. 14E and 14F are side views showing the way a selecting arm behaves as the shift lever shown in FIG. 14A moves from the neutral position to the changeup position;

FIG. 15 is a perspective view of a detent unit that constitutes the principal part of a second embodiment of the invention;

FIG. 16 is a perspective view of a detent unit that constitutes the principal part of a third embodiment of the invention and its surrounding structures;

FIG. 18 is a sectional view taken along line XVIII—XVIII of FIG. 17, showing the module switch of the mode switch system and its surroundings;

FIG. 19 is a sectional view of the module switch shown in FIG. 18;

DETAILED DESCRIPTION OF THE INVENTION

Figure 1:
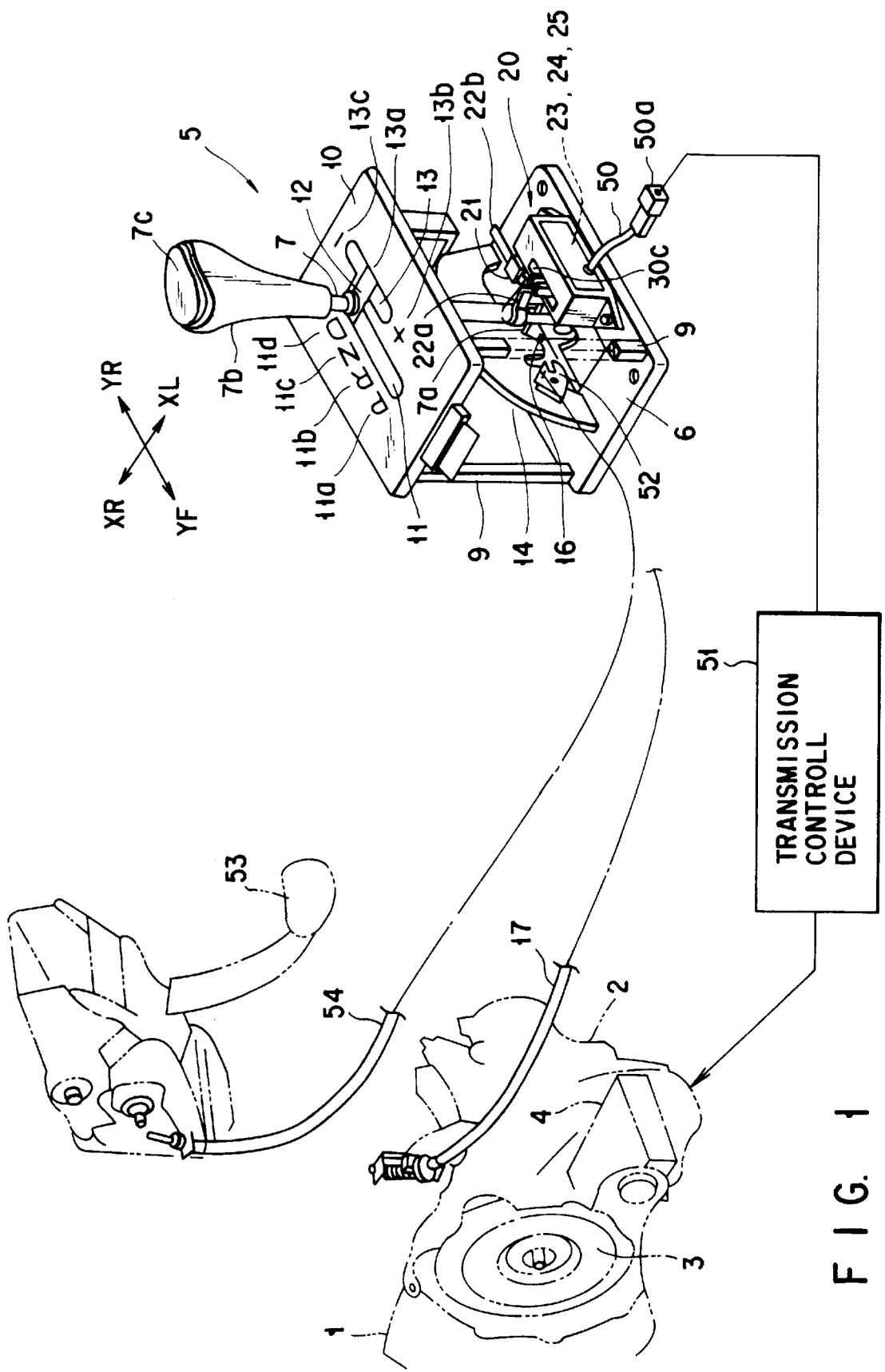
FIG. 1 is a perspective view showing a gearshift apparatus according to a first embodiment of the present invention along with an automatic speed change gear connected thereto.

Referring now to FIGS. 1 to 14F, a first embodiment of the present invention will be described. FIG. 1 shows an outline of an electronically-controlled automatic speed change gear to which the invention is applied. An engine 1 shown in FIG. 1 is contained in an engine room of an automobile. A body 2 of the automatic speed change gear is connected to the output shaft (not shown) of the engine 1 by means of a torque converter 3. The speed change gear body 2 comprises, for example, a planetary gear mechanism (not shown) housed in a transmission case, an on-off mechanism (not shown), such as a clutch, for regulating the rotation of elements of the planetary gear mechanism, and a control valve unit 4 for controlling the on-off mechanism by utilizing the inflow and outflow of oil.

Figure 4:
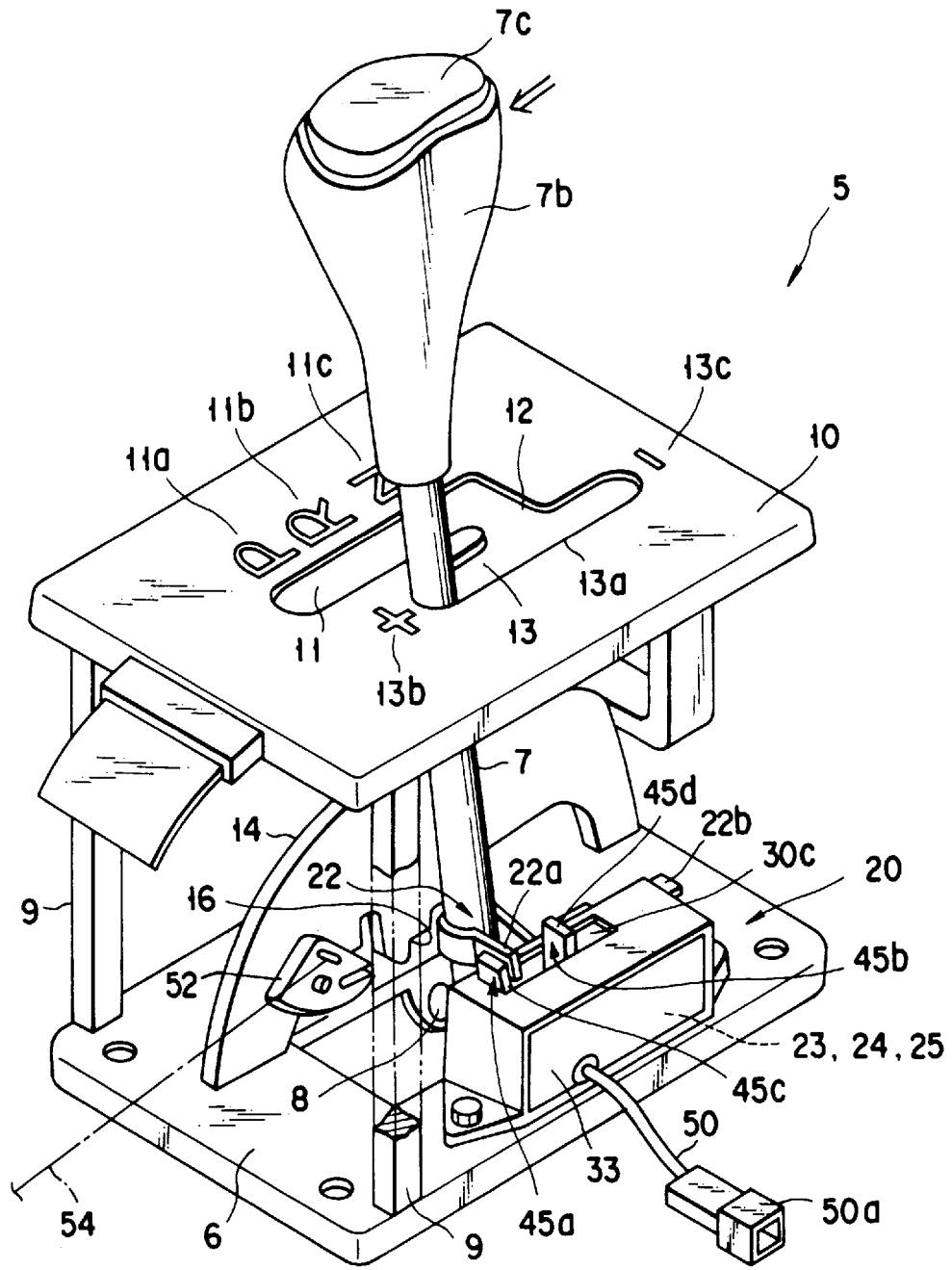
FIG. 4 is a perspective view showing the shift lever of the gearshift apparatus moved from the neutral position to a change-up position.

A gearshift apparatus 5 of the automatic speed change gear is provided between a driver's seat and a front seat (assistant driver's seat), which are not shown. The apparatus 5 can select two transmission modes, an automatic transmission mode and a manual transmission mode for manual operation. FIGS. 2, 3 and 4 show the general arrangement of the apparatus 5. The following is a description of the construction of the gearshift apparatus 5. In the description of the present embodiment to follow, the transverse direction of a vehicle body indicated by arrows $X_L$ and $X_R$ in FIG. 1 is referred to as a selecting direction, and the longitudinal direction indicated by arrows $Y_F$ and $Y_R$ as a shifting direction.

A base plate 6 is mounted on that part of the vehicle body (not shown) beside the driver's seat, and constitutes a mounting surface of the gearshift section of the automobile. A shift lever 7 extends upward from the center of the base plate 6. As shown in FIG. 5, the lower end of the shift lever 7 is rockably supported on the central portion of the plate 6 by means of a coupling 8. Since shafts 8a and 8b of the coupling 8 cross at right angles in the selecting and shifting directions, respectively, the whole shift lever 7 can rock in both the selecting and shifting directions.

A detent pin 7a projects in the vehicle width direction from a vertically extending slot 7d in the outer periphery of the lower part of the shift lever 7. Normally, the pin 7a is urged upward by a detent spring (not shown). When an unlocking button 7c on a shift knob 7b is depressed, the detent pin 7a descends. An indicator panel 10 is supported over the base plate 6 by means of support arms 9 that extend upward from an edge portion of the plate 6. The panel 10 is in the form of a flat plate overhanging the base plate 6. A main gate (first gate) 11 for the automatic transmission mode is formed in that part of the panel 10 which is situated just on the right (in the direction of arrow $X_R$) of the center of the panel. The main gate 11 is in the form of a slot extending in the longitudinal direction of the vehicle body.

The main gate 11 is provided with a plurality of shift positions 11a, 11b, 11c and 11d indicated successively by P (parking), R (reverse), N (neutral), and D (drive) from the front side of the vehicle body to the rear, for example. The position D is an automatic transmission position in which the transmission stage of the automatic speed change gear is changed in accordance with the driving conditions of the automobile. A transit gate (second gate) 12 extends from that part of the main gate 11 which corresponds to the position D toward the center of a manual gate (third gate) 13 for the manual transmission mode. The transit gate 12 is in the form of a slot extending in a direction different from the extending direction of the main gate 11, e.g., in the vehicle width direction. The manual gate 13 is connected to an end portion of the transit gate 12. The gate 13 is in the form of a slot extending from the position of connection with the transit gate 12 in a direction different from the extending direction of the gate 12. More specifically, the third gate 13 is a slot that extends equally forward and rearward from the position of connection with the second gate 12 and parallel to the first gate 11. The second gate 12 is formed extending substantially at right angles to the. first and third gates 11 and 13. The position of connection of the third gate 13 with the second gate 12 corresponds to a neutral position 13a. That end portion of the gate 13 which is situated on the vehicle front side of the neutral position 13a defines a change-up position (+) 13b. The end portion on the rear side of the neutral position 13a defines a change-down position (−) 13c.

The shift lever 7 penetrates the gates 11, 12 and 13 for movement. The whole shift lever can rock in the directions of movement in the gates 11, 12 and 13, that is, in the selecting direction indicated by arrows XL and XR in FIG. 1 and the shifting direction indicated by arrows YF and YR. An arched detent plate 14 is set up on one side of the base plate 6 with respect to the vehicle width direction, e.g., on the right (in the direction of arrow XR) of the shift lever 7. Detent notches 16 for defining the shift positions 11a, 11b, 11c and 11d of the first gate 11 are formed in the undersurface of the detent plate 14, corresponding to the shift positions, individually. The detent pin 7a of the shift lever 7 is designed so as to engage one of the detent notches 16 when the shift lever 7 is in the gate 11. The shift lever 7 can be located in any of the shift positions 11a to 11d of the main gate 11 by utilizing the detent notches 16 corresponding to the shift positions.

When the shift lever 7 is in the main gate 11, it engages an arm assembly (not shown) to which a shift cable 17 is connected. The cable 17 extends from the body 2 of the automatic speed change gear toward the gearshift apparatus 5. Accordingly, the body 2 is operated as the shift lever 7 moves in the gate 11. The detent pin 7a is disengaged from one of the detent notches 16 of the detent plate 14 when the shift lever 7 is tilted in the vehicle width direction and moved from the main gate 11 to the manual gate 13. Thus, the automatic transmission mode is canceled when the shift lever 7 is tilted toward the gate 13.

A detent unit 20 for use as supporting means is provided on the opposite side of the shift lever 7 to the detent plate 14, that is, on the left-hand side (in the direction of arrow $X_L$) of the base plate 6. The unit 20 has a function to hold the shift lever 7 on the side for the automatic or manual transmission mode and a function to produce a click feeling as the transmission mode is switched.

As shown in the schematic view of FIG. 5, the detent unit 20 includes a moving member 21 for selection that is formed separately from the shift lever 7. A retaining force is transmitted from the member 21 to the outer periphery of the lower part of the shift lever 7 (more specifically, an arm member 22 over the detent pin 7a). The moving member 21 functions as a linkage member. The detent unit 20 contains therein a neutral retaining mechanism 23, a mode switch system 24, and a shift switch system 25, as well as the moving member 21 and the arm member 22. The retaining mechanism 23 serves to hold the shift lever 7 in the neutral position in the manual transmission mode. The system 24 is used to detect the current transmission mode, automatic or manual, and the system 25 to detect the position (change-up or -down position 13b or 13c) of the shift lever 7 in the manual transmission mode. The mode and shift switch systems 24 and 25 function as mode detecting means and shift detecting means, respectively.

Figure 7:
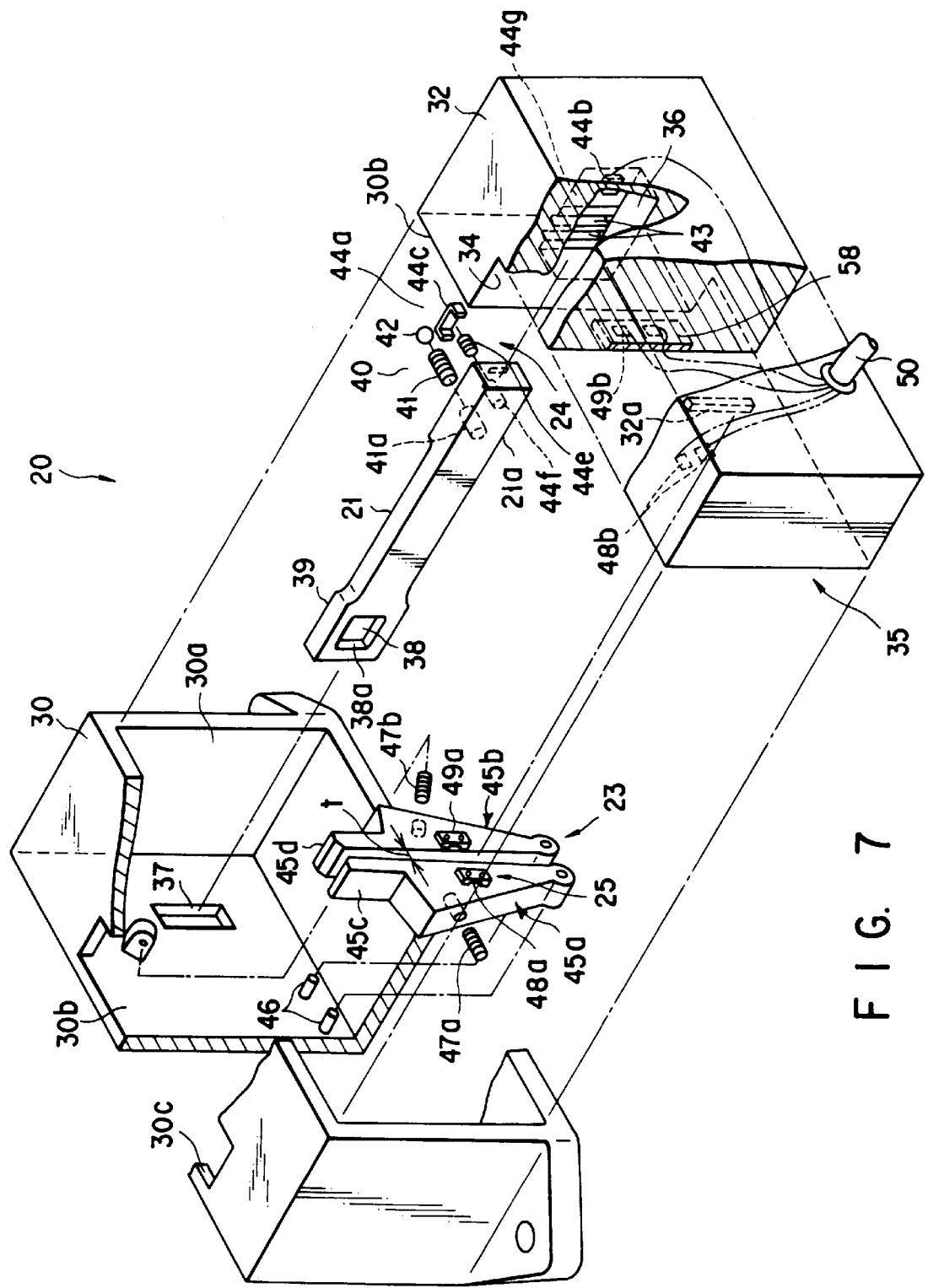
FIG. 7 is a perspective view showing the details of the construction of the detent unit.
Figure 8:
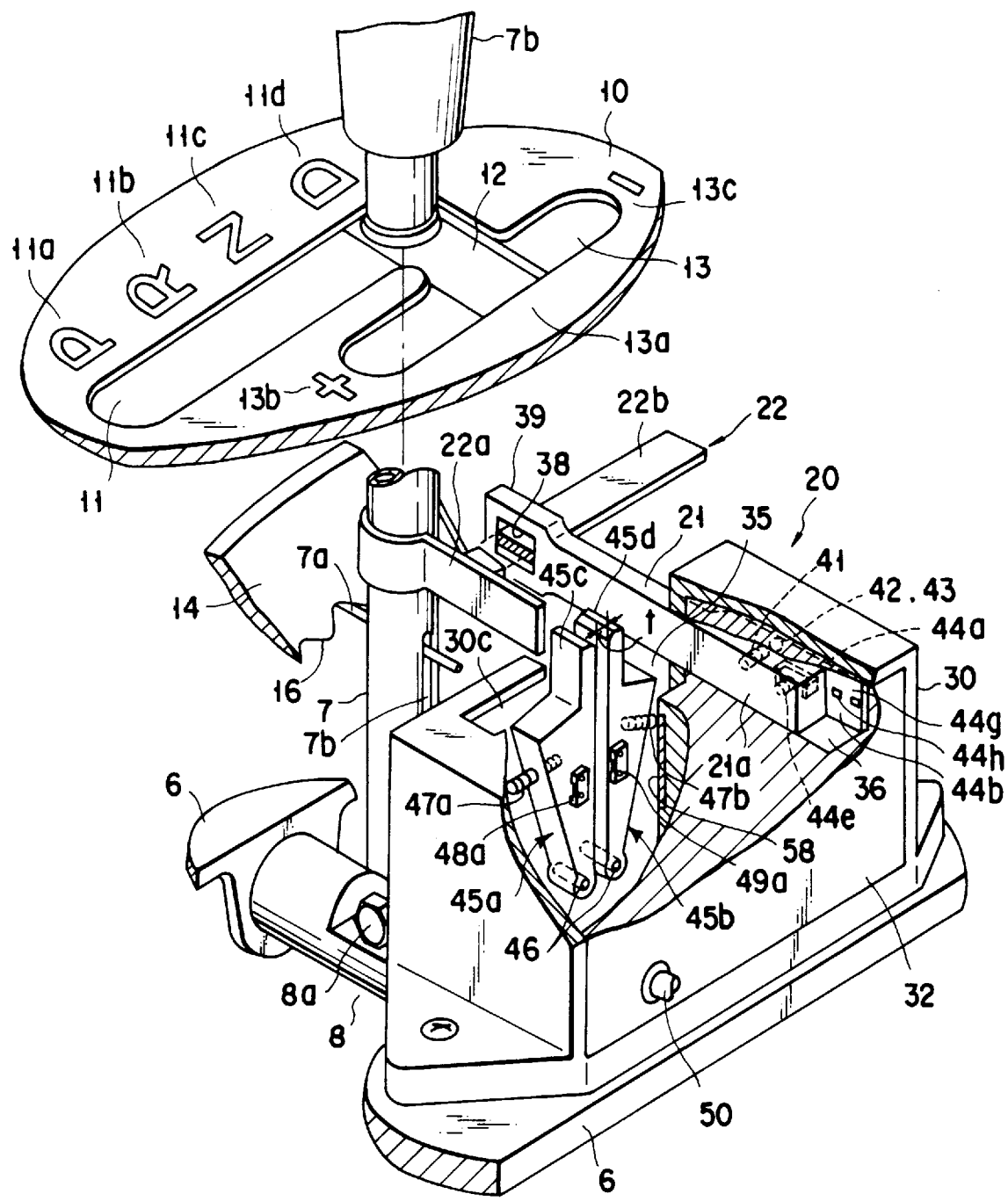
FIG. 8 is a perspective view showing the detent unit with the shift lever in the D-position.
Figure 10A:
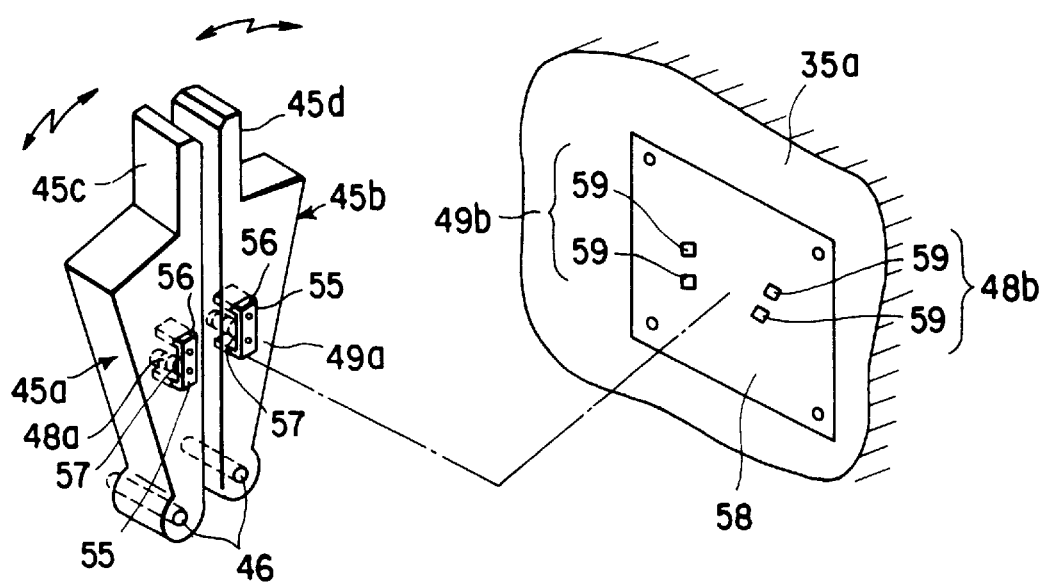
FIG. 10A is a perspective view showing an arrangement of a shift switch system of the detent unit.
Figure 10B:
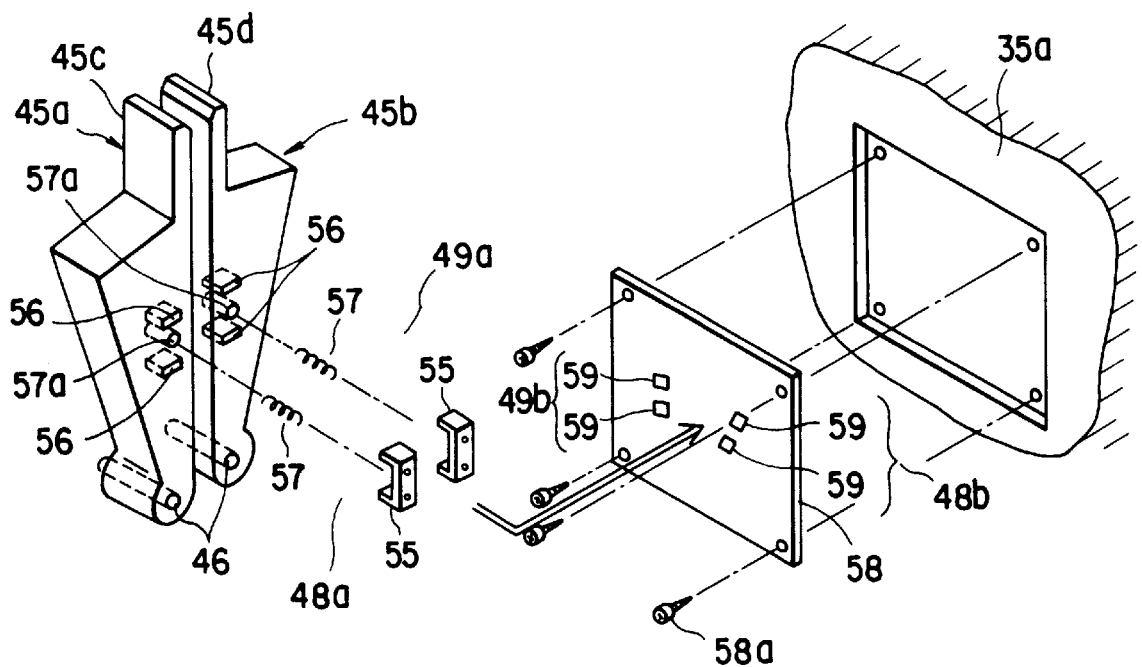
FIG. 10B is an exploded perspective view of the shift switch system shown in FIG. 10A.
Figure 11:
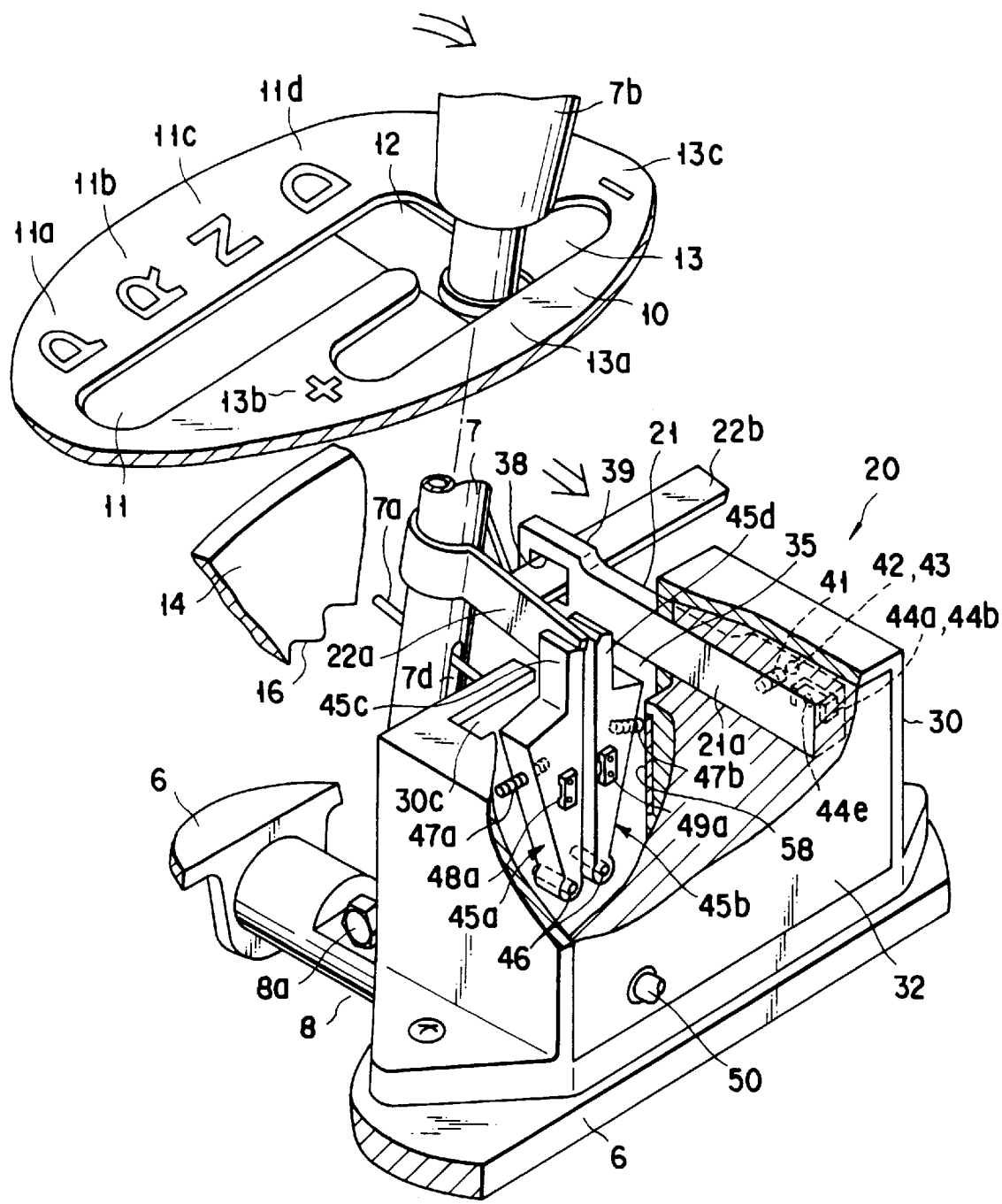
FIG. 11 is a perspective view showing the detent unit with the shift lever in the neutral position for the manual transmission mode.

FIGS. 6 and 7 show a specific arrangement of the detent unit 20 that incorporates the functions described above. FIGS. 8, 11 and 12 illustrate the behavior of the detent unit 20 caused when the shift lever 7 is manipulated. FIGS. 9 and 10 shows the details of the arrangements of various parts of the detent unit 20. Before explaining the detent unit 20, the arm member 22 will be described.

As shown in FIG. 5, the arm member 22 is formed of a metallic batten, for example, and its middle portion is wound around that part of the outer peripheral surface of the shift lever 7 which is situated right over the detent pin 7a. A first portion 22a of the arm member 22 is positioned vertically along the axis of the shift lever 7, and extends toward the detent unit 20 from that part of the outer peripheral portion of the shift lever 7 which faces the unit 20. A second portion 22b of the arm member 22 is positioned horizontally at right angles to the axis of the lever 7, and extends rearward from that part of the outer peripheral portion of the shift lever 7 which is situated on the vehicle rear side. The first portion 22a that extends toward the unit 20 serves as an arm for shifting, while the second portion 22b that extends on the vehicle rear side functions as a selecting arm. The selecting arm 22b is equivalent to an actuating member.

The following is a description of the detent unit 20. FIG. 6 shows an external appearance of the detent unit 20, and FIG. 7 shows the internal structure of the unit 20. A box-shaped casing 30 is mounted on the upper surface of the base plate 6 so as to extend in the longitudinal direction of the vehicle body. The casing 30 is in the form of a rectangular prism-shaped box having an opening 30a in its face opposite from the shift lever 7. A block-shaped holder 32 is inserted into the casing 30 through its opening 30a. A body 33 of the detent unit 20 is formed by combining the casing 30 and the holder 32. A step 34 is formed in, for example, the front end portion of the holder 32 at which the holder 32 inserted in the casing 30 faces the shift lever 7. The step 34 is recessed from a side wall 30b of the casing 30. A lever chamber 35 is defined in a space surrounded by the step 34 and the side wall 30b of the casing 30.

A slide chamber 36 is formed in the rear side portion of the holder 32 at which the holder 32 inserted in the casing 30 faces one side edge of the selecting arm 22b. The chamber 36 extends straight in the vehicle width direction, from the end face of the holder 32 at its inserted portion toward the opposite face thereof. For example, the chamber 36 has the form of a bottomed square hole. The moving member 21 for selection is supported by the inner surface of the slide chamber 36 for sliding motion in the selecting direction of the shift lever 7. More specifically, a proximal portion 21a of the moving member 21 is substantially in the form of a batten with a square cross section corresponding to the shape of the slide chamber 36. The proximal portion 21a of the moving member 21 is slidably inserted in the slide chamber 36.

The distal end portion of the moving member 21 for selection projects toward the shift lever 7 through a square aperture 37 in the side wall 30b of the casing 30. A penetrating portion 39 having a hole 38 is formed at the distal end portion of the moving member 21. The hole 38 extends in the longitudinal direction of the gates 11 and 13 or the moving direction of the shift lever 7. The selecting arm 22b of the arm member 22 slidably penetrates the hole 38. The hole 38 has dimensions such that the arm 22b can move longitudinally therein as the shift lever 7 moves longitudinally in the gate 11 or 13. At the same time, the hole 38 is sized so that the other side edge of the arm 22b engages its inner wall surface 38a of the hole 38 when the shift lever 7 moves transversely in the transit gate 12. Accordingly, the whole moving member 21 for selection can move in the longitudinal direction of the slide chamber 36 along the gate 12 as the shift lever 7 moves in the gate 12. Thus, when the shift lever 7 is manipulated for longitudinal movement in the automatic or manual transmission mode, the moving member 21 is freed from the shift lever 7, and never follows the motion of the shift lever 7. Only when the shift lever 7 is switched between the automatic and manual transmission modes, the moving member 21 moves integrally with the shift lever 7 in the width direction (transverse direction) of the vehicle body. The selecting arm 22b is long enough to be continually kept inserted in the hole 38 when the shift lever 7 is moved longitudinally in the automatic or manual transmission mode. The hole 38 may be replaced with an open-topped groove (not shown) formed in the distal end portion of the moving member 21 so as to extend in the longitudinal direction. In this case, the arm 22b is passed through the groove for longitudinal movement.

The moving member 21 for selection is provided with a retaining mechanism 40 at its proximal portion 21a. The mechanism 40 serves as retaining means that generates a retaining force for retaining the shift lever 7 at either end of the gate 12. The retaining mechanism 40 is provided with a engaging member 42. The engaging member 42 is fitted for projection and retraction in a recess that is formed in the wall surface of the proximal portion 21a of the moving member 21 surround by the slide chamber 36, e.g., one side face of the proximal portion 21a. The engaging member 42 is urged to be pushed out of the recess by a compression spring 41. For example, a steel ball or round-ended pin may be used as the engaging member 42.

More specifically, a hole 41a is formed in one side face of the moving member 21 for selection across its thickness, as shown in FIG. 9A. The hole 41a contains therein the engaging member 42 and the compression spring 41 for urging the member 42. A pair of recess 43 for receiving the engaging member 42 are formed in the inner wall surface of the slide chamber 36, corresponding individually two positions in which the engaging member 42 is alternatively situated when the shift lever 7 is moved to either end of the gate 12. For example, each recess 43 is in the form of a groove, preferably a vertically extending V-groove. When the moving member 21 moves from one end of the gate 12 to the other in concert with the shift lever 7, the engaging member 42 is disengaged from one of the recess 43 and engages the other. As a result, the moving member 21 is held in position depending on the position of the other recess 43, whereupon a retaining force to retain the shift lever 7 is generated. In the case where a steel ball is used as the engaging member 42, each recess 43 may be formed of a concave spherical surface. A click feeling is produced at the start and end of mode switch operation (switch between the automatic and manual transmission modes) by utilizing the change of the retaining force of the shift lever 7 caused by the engaging member 42 getting into and out of the recess 43.

A pair of contacts, a movable contact 44a and a fixed contact 44b, are arranged on one side face of the moving member 21 for selection and the wall surface of the slide chamber 36 opposite thereto, respectively. These contacts 44a and 44b are joined to be connected electrically to each other when the moving member 21 reaches its position for the manual transmission mode, for example. When the moving member 21 reaches its position for the automatic transmission mode, on the other hand, the contacts 44a and 44b are disengaged to be disconnected electrically. Specifically, the movable contact 44a is formed of a substantially U-shaped movable contact plate 44c, as shown in FIG. 9B. The opposite end portions of the contact plate 44c are slidably inserted in a pair of slots 44d, individually, in the one side face of the moving member 21 in the vicinity of the engaging member 42. A contact spring 44e formed of a coil spring is provided between the center of the back of the movable contact plate 44c and the side face portion of the moving member 21 opposite thereto. The spring 44e urges the plate 44c to be pushed out toward the fixed contact 44b. More specifically, a hole 44f for the spring 44e is formed in the side face portion of the moving member 21 between the two slots 44d, and one end portion of the contact spring 44e is slidably inserted in the hole 44f. The entire spring 44e is held compressed between the movable contact plate 44c and the member 21. The fixed contact 44b is attached to a substrate 44g represented by a printed board, for example. The substrate 44g is fixed to the wall surface portion of the slide chamber 36 corresponding to the contact plate 44c by means of, for example, screws 44i.

Arranged on the surface of the substrate 44g are a pair of contact portions 44h, which are connected electrically as they come into contact with the movable contact plate 44c when the moving member 21 is in the position for the manual transmission mode. The contact portions 44h are disconnected electrically as they are separated from the contact plate 44c when the member 21 is moved to the position for the automatic transmission mode. The substrate 44g is embedded in the wall surface portion of the slide chamber 36 lest it hinder the movement of the member 21.

The transmission mode, automatic or manual, for which the moving member 21 is positioned can be detected in response to a signal indicative of the electrical connection or disconnection between the contacts 44a and 44b. The movable and fixed contacts 44a and 44b constitute the mode switch system 24 for obtaining mode switch signals.

As shown in FIG. 5, the neutral retaining mechanism 23 is housed in the lever chamber 35. The mechanism 23 includes a pair of moving members 45a and 45b for shifting, each having a substantially triangular external shape that resembles a halved fan. These members 45a and 45b are arranged in the lever chamber 35 so as to hold a stopper 32a (shown in FIG. 7) between them. The stopper 32a is formed on the end face of the inserted portion of the holder 32 in the casing 30, for example. The stopper 32a projects toward the moving members 45a and 45b in a position corresponding to the neutral position 13a in the manual gate 13. In other words, the moving members 45a and 45b for shifting are arranged in the moving direction along the gate 13. A parallel pair of support shafts 46, which are formed on the inner surface of the side wall 30b of the casing 30, are rotatably inserted in the respective lower end portions of their corresponding members 45a and 45b. The moving members 45a and 45b are supported by the shafts 46 so that they can rock toward and away from the stopper 32a (in the moving direction along the manual gate 13). A pair of claws 45c and 45d protrude upward from the adjacent parts of the upper end portions of the members 45a and 45b, respectively. These claws 45c and 45d project above the casing 30 through a longitudinally extending slot 30c in the top wall of the casing 30. The slot 30c has a longitudinal length such that the displacement of the claws 45c and 45d rocking around the shafts 46 cannot be hindered.

The claws 45c and 45d projecting above the casing 30 are kept at a distance t from each other, depending on the width of the stopper 32a, such that the arm 22a for shifting can be passed between the claws. The distance or gap t allows the arm 22a to be inserted between the claws 45c and 45d when the shift lever 7 is moved from the transit gate 12 to the neutral position 13a in the third gate 13.

The moving members 45a and 45b for shifting are urged toward the neutral position 13a in the manual gate 13 by means of the elastic force of compression springs 47a and 47b that are arranged between the respective side faces of the moving members and the wall surface of the lever chamber 35. Thus, the claws 45c and 45d are held in the neutral position 13a in a manner such that they are urged from both sides, front and rear, by the springs 47a and 47b. When the arm 22a for shifting is inserted between the claws 45c and 45d of the moving members 45a and 45b for shifting, therefore, the arm 22a is elastically urged toward the neutral position 13a, so that the shift lever 7 is held in the position 13a. The one moving member 45a for shifting and the spring 47a serve as first urging means, and the other moving member 45b and the spring 47b as second urging means.

When the shift lever 7 is moved from the neutral position 13a in the manual gate 13 to the change-up or -down position 13b or 13c, only the moving member 45a or 45b for shifting that is situated on the operating side rocks from the neutral position 13a to the position 13b or 13c in a manner such that it is in engagement with the arm 22a. As the compression spring 47a or 47b is compressed at this time, a reaction force to restore the shift lever 7 to the neutral position is generated.

A pair of contacts, a movable contact 48a and a fixed contact 48b, are arranged on a side face of the front moving member 45a for shifting and the end face of the holder 32 opposite thereto, respectively. These contacts 48a and 48b are connected electrically to each other when the member 45a is moved to the change-up position 13b, for example. When the moving member 45a returns to the neutral position 13a, the contacts 48a and 48b are disengaged to be disconnected electrically. A movable contact 49a and a fixed contact 49b, which has the same function for electrical conduction as the contacts 48a and 48b, are also arranged on a side face of the rear moving member 45b for shifting and the end face of the holder 32 opposite thereto, respectively. FIG. 10B shows the arrangements of the movable contacts 48a and 49a and the fixed contacts 48b and 49b. Since the movable and fixed contacts 48a and 48b are constructed in the same manner as the movable and fixed contacts 49a and 49b, respectively, only the contacts 49a and 49b will be described representatively in the following.

The movable contact 49a is formed of a substantially U-shaped movable contact plate 55. The opposite end portions of the contact plate 55 are slidably inserted in a pair of slots 56, individually, in the side face of the moving member 45b. A contact spring 57 formed of a coil spring is provided between the center of the back of the movable contact plate 55 and the side face of the moving member 45b opposite thereto. The spring 57 urges the plate 55 to be pushed out from the slots 56. More specifically, a hole 57a for the spring 57 is formed in the side face portion of the moving member 45b between the two slots 56, and one end portion of the contact spring 57 is slidably inserted in the hole 57a. The entire spring 57 is held compressed between the movable contact plate 55 and the member 45b. The fixed contact 49b is attached to a substrate 58 formed of a printed board, for example. The substrate 58 is fixed to a wall surface 35a of the lever chamber 35 that faces the respective side faces of the moving members 45a and 45b by means of, for example, screws 58a.

More specifically, contact portions 59 are arranged on the surface of the substrate 58, corresponding to the respective positions of the movable contact plates 55 reached when the moving members 45a and 45b for shifting are moved to the change-up or -down position 13b or 13c. When the one moving member 45a is in the change-up position 13b, the front movable contact plate 55 come into contact with the front contact portions 59, whereupon the front contact portions are connected electrically to each other. When the other moving member 45b is in the change-down position 13c, the rear movable contact plate 55 come into contact with the rear contact portions 59, whereupon the rear contact portions 59 are connected electrically to each other. When the moving members 45a and 45b are in the neutral position 13a, their respective contact plates 55 are disengaged from the contact portions 59, so that the contact portions 59 are disconnected electrically from one another. The substrate 58 is buried under the wall surface 35a of the lever chamber 35 lest it hinder the movement of the moving members 45a and 45b for shifting. A change-up or -down signal is outputted in response to signals for electrical conduction obtained from the movable contacts 48a and 49a and the fixed contacts 48b and 49b. The movable contacts 48a and 49a and the fixed contacts 48b and 49b constitute the shift switch system 25.

As shown in FIG. 7, the movable contacts 44a, 48a and 49a and the fixed contacts 44b, 48b and 49b are connected to a transmission control device 51, which is formed of, for example, a microcomputer, by means of a cord 50 led out from the holder 32 and a connector 50a (shown in FIG. 1) connected to the end of the cord 50. The mode switch signals and the change-up and -down signals delivered from the movable contacts 44a, 48a and 49a and the fixed contacts 44b, 48b and 49b are processed in the control device 51. More specifically, the control mode is changed between the automatic and manual transmission modes in accordance with the position of the shift lever 7 by the control device 51. When the shift lever 7 is situated in the change-up position 13b, the transmission stage is set or changed for change-up operation. When the shift lever 7 is situated in the change-down position 13c, the transmission stage is set or changed for change-down operation.

A locking cam 52 that is attached to the detent plate 14, as shown in FIG. 1, has a function to restrain the action of the shift lever 7 so that the shift lever 7 can be moved from the P-position 11a to the other positions 11b to lid only when a brake pedal 53 is stepped on. A cable 54 is a member for transmitting the action of the pedal 53 to the cam 52.

The following is a description of the operation of the gearshift apparatus 5 constructed in this manner. Let it be supposed, for example, that the shift lever 7 is situated in the D-position 11d in the main gate 11 at the one end of the transit gate 12. In this state, the shift lever 7 is elastically held in the D-position 11d by the detent unit 20, as shown in FIGS. 2 and 8. At this point of time, the moving member 21 for selection, having been moved to the main gate 11, is held in the aforesaid position as the engaging member 42, urged to be pushed out from the moving member 21, is fitted in one of the recess 43. Thus, the movement of the engaging member 42 is restrained by the recess 43. A force to retain the moving member 21 is generated as the movement of the member 21 is restrained in this manner. As this retaining force is transmitted to the shift lever 7 through the selecting arm 22b, the shift lever 7 is held at the one end of the transit gate 12, that is, in the main gate 11.

Suppose the driver moves the shift lever 7 longitudinally along the main gate 11 in order to select any of the other shift positions 11a to 11c than the D-position 11d. In this case, the moving member 21 for selection never moves, and only the selecting arm 22b slides longitudinally in the hole 38 in the penetrating portion 39 of the moving member 21. Thus, if the shift lever 7 is operated in the longitudinal direction, it alone moves longitudinally along the gate 11 with the moving member 21 unmoved. If the detent pin 7a is fitted in any of the detent notches 16 in a desired shift position by releasing the unlocking button 7c, the shift lever 7 is held in the desired shift position for the automatic transmission mode.

Suppose the shift lever 7 is moved from the D-position 11d to the other end side of the transit gate 12, that is, the neutral position 13a in the manual gate 13 in order to change the automatic transmission mode over to the manual transmission mode. In this case, the moving member 21 for selection moves in the same direction as the shift lever 7, as shown in FIGS. 3, 11, 14B and 14D. Thus, when the shift lever 7 is operated in the aforesaid direction, the side edge of the selecting arm 22b engages the inner wall surface 38a of the hole 38 in the moving member 21, so that the whole moving member 21 is pressed in the moving direction of the shift lever 7. Accordingly, the moving member 21 for selection slides in the same direction as the direction for the lever operation, that is, into the slide chamber 36. When the shift lever 7 starts to move in the aforesaid direction, the engaging member 42 gets out of the recess 43 on the right-hand side ($X_R$ side) and moves to the flat side face of the slide chamber 36, so that the force having so far been retaining the shift lever 7 in the main gate 11 is reduced.

When the engaging member 42 gets out of the recess 43 in this manner, the retaining force becomes much smaller than when the engaging member 42 is in the recess 43. Accordingly, a click feeling can be obtained at the start of mode change operation. When the shift, lever 7 is inclined toward the manual gate 13, as shown in FIGS. 3 and 11, the arm 22a for shifting, along with the shift lever 7, rocks around the shaft 8a, the axis of rocking motion of the shift lever 7, so as to incline toward the detent unit 20. Thereupon, the detent pin 7a is disengaged from the detent notch 16. When the shift lever 7 is in the neutral position 13a, the arm 22a is ready to be received between the pair of claws 45c and 45d that project above the detent unit 20. When the shift lever 7 is inclined toward the manual gate 13 and moved to the neutral position 13a, therefore, the arm 22a for shifting is inserted between the claws 45c and 45d. When the shift lever 7 reaches the neutral position 13a, the engaging member 42 of the moving member 21 for selection gets to the recess 43 on the left-hand side ($X_L$ side). Thereupon, the engaging member 42, having so far been retreated in the hole 41a, is pushed out to be fitted into the recess 43 by means of the elastic force of the compression spring 41. When the engaging member 42 is fitted in this recess 43, the motion of the moving member 21 is restrained, so that the shift lever 7 is held in the neutral position 13a in the manual gate 13. As a result, the shift lever 7 is shifted from the automatic transmission mode to the manual transmission mode, and the engaging member 42 restrains the motion of the moving member 21, so that a click feeling can be enjoyed at the end of the mode change operation. When the mode change is finished, the movable contact 44a of the moving member 21 for selection is connected electrically to the fixed contact 44b of the slide chamber 36, as shown in FIG. 14D. Thereupon, a signal indicative of the change of the automatic transmission mode over to the manual transmission mode is delivered to the transmission control device 51.

The following is a description of a case in which the shift lever 7, having been shifted to the manual transmission mode by the operation described above, is operated to be moved from the neutral position 13a along the manual gate 13. Suppose the shift lever 7 is moved toward the change-up position 13b for the change-up operation, for example. In this case, the front claw 45c engages the arm 22a for shifting that moves forward together with the shift lever 7, as shown in FIGS. 4, 12 and 13E. The claw 45c rocks forward around its corresponding shaft 46. At this point of time, the moving member 21 for selection is held in the position for the manual transmission mode by the engaging member 42. The arm 22b for selection is inserted for longitudinal movement (in the direction of shift operation) in the hole 38 of the moving member 21. Accordingly, in this case, the moving member 21 for selection never moves, as in the case of the automatic transmission mode. Thus, the shift lever 7 is allowed to move in the change-up direction as the arm 22b slides in the hole 38 of the moving member 21, as shown in FIGS. 12 and 14F. In consequence, the shift lever 7 becomes independent of the moving member 21, as in the automatic transmission mode, and can move to the change-up position 13b in the manual gate 13.

When the shift lever 7 reaches the change-up position 13b, as shown in FIGS. 12 and 13E, the movable contact 48a of the moving member 45a for shifting is connected electrically to the fixed contact 48b of the holder 32 that is situated on the front side of the lever chamber 35. Accordingly, a detection signal indicative of the shift of the shift lever 7 to the change-up position 13b is delivered to the transmission control device 51. Thereupon, the change-up operation terminates.

When the shift lever 7 is operated for movement toward the change-down position 13c, the rear moving member 45b for shifting is rocked rearward by the arm 22a for shifting. Also in this case, the arm 22b for selection slides in the hole 38 of the moving member 21. Accordingly, the shift lever 7 is allowed to move toward the change-down position 13c. When the shift lever 7 reaches the change-down position 13c, the movable contact 49a of the moving member 45b comes into touch with the fixed contact 49b, whereupon a detection signal indicative of the shift of the shift lever 7 to the change-down position 13c is delivered to the transmission control device 51. In response to the detection signal indicative of the change-up or change-down operation, the control device 51 changes the transmission stage of the automatic speed change gear.

As described above, the detent unit 20 for mode change according to the present embodiment retains the shift lever 7 by means of the moving member (linkage member) 21 that is constructed separately from the shift lever 7. According to this arrangement, a click feeling can be enjoyed without providing the shift lever 7 itself with any retaining mechanism when the shift lever 7 is shifted between the automatic and manual transmission modes. At the same time, the retaining function of the shift lever 7 can be maintained. Thus, the structure of the shift lever 7 can be simplified, and the reliability of the shift lever 7 can be improved correspondingly. Moreover, the moving member 21 for selection, which generates the retaining force, never follows the motion of the shift lever 7 when the shift lever 7 moves longitudinally in the first or third gate 11 or 13. In operating the shift lever 7 for longitudinal movement in the automatic or manual transmission mode, therefore, the shift lever 7 is not subjected to any load from the respective weights of the moving member 21, engaging member 42, contact plate 44c, etc. Accordingly, the operating force of the shift lever 7 for the automatic and manual transmission modes can be reduced, so that the controllability of the shift lever in each mode can be improved.

In the gearshift apparatus 5 according to the above-described embodiment in which the main and manual gates 11 and 13 are arranged parallel to each other, in particular, the detent unit 20 includes the moving member 21 for selection having the hole 38 (or groove), through which the arm 22a of the shift lever 7 is passed, and the arm 22b for selection, and the moving member 21 is moved along the transit gate 12 by causing the arm 22b to abut against the inner wall surface of the hole 38 (or groove) as the shift lever 7 moves in the gate 12. Thus, a high-reliability detent operation can be carried out despite the simple construction.

The gate 13 for the manual transmission mode has the neutral position 13a, which corresponds to the other end of the transit gate 12, and the first and second shift positions 13b and 13c in front and in the rear of the neutral position 13a, respectively. Also, the shift lever 7 moving longitudinally in the manual gate 13 is held in the neutral position 13a by means of the neutral retaining mechanism 23 (second retaining means) on the base plate 6. Thus, the shift lever 7 never fails to return to the neutral position when it is non-operating in the gate 13, so that the controllability of the shift lever 7 in the manual transmission mode is improved.

The neutral retaining mechanism 23 includes the moving member 45a and 45b for shifting, for use as the first and second urging means, respectively. The first moving member 45a urges the shift lever 7 toward the neutral position 13a by abutting against the shift lever 7 between the neutral position 13a and the change-up position 13b. The second moving member 45b urges the shift lever 7 toward the neutral position 13a by abutting against the shift lever 7 between the neutral position 13a and the change-down position 13c. According to this arrangement, the moment of inertia of the shift lever 7 that is operated along the manual gate 13 can be reduced. Thus, the force required for the operation of the shift lever 7 can be lessened, and the shift lever 7 can be returned to the neutral position in the manual transmission mode.

The body 33 of the detent unit 20 contains therein the moving member 21 for selection, moving members 45a and 45b for shifting, retaining mechanism 40, neutral retaining mechanism 23, mode switch system 24, and shift switch mechanism 25 described above. Accordingly, the various necessary functions for the selecting and shifting operations of the shift lever 7 are concentrated on the single body 33. With use of the detent unit 20 arranged in this manner, the necessary functions for the selecting and shifting operations of the shift lever 7 can be obtained by only combining the unit 20 with the shift lever 7. Besides, the unit 20 has the advantage of being adapted for common use in different types of gearshift apparatuses 5. Since the unit 20 can be attached to the vehicle by only being fixed to the base plate 6, moreover, the gearshift apparatus 5 can be mounted and replaced with ease. Since both the mode and shift switch systems 24 and 25 are housed in the detent unit 20, in particular, there is no possibility of any switches being damaged during the attachment operation for the unit 20.

FIG. 15 shows a second embodiment of the present invention. According to this embodiment, switches, such as microswitches, are used in place of the aforementioned movable and fixed contacts. These switches serve to deliver mode detection signals for the automatic and manual transmission modes and also the change-up and -down signals. More specifically, a microswitch 60 for selection is mounted on the outer surface of the casing 30 by means of a bracket 60a, and is used in place of the aforementioned movable and fixed contacts that output the mode detection signals. The switch 60 detects the movement of the shift lever 7 to the one or the other end of the transit gate 12 by being activated when the moving member 21 for selection moves in the direction of arrow $X_L$ or $X_R$. A pair of microswitches 62a and 62b for shifting are arranged on the outer surface of the casing 30. These switches 62a and 62b are turned on or off when the shift lever 7 is moved from the neutral position 13a in the manual gate 13 to the change-up or -down position 13b or 13c. The switches 62a and 62b have their respective actuators 61 situated on either side, front or rear, of a position corresponding to the gap t between the claws 45c and 45d. This arrangement ensures the same effect of the first embodiment.

FIG. 16 shows a third embodiment of the present invention. According to this embodiment, the moving member 21 for selection is designed so as to slide in the direction of arrow X when part of it is brought directly into contact with the shift lever 7. More specifically, the moving member 21, which is L-shaped, includes a first arm portion 65a, inserted in the slide chamber 36 for movement in the direction of arrow X, and a second arm portion 65b, extending from the outer end of the first arm portion 65a toward the shift lever 7 along the gates 11 and 13. The second arm portion 65b is formed having a slot 66 that extends along the gates 11 and 13. The shift lever 7 is passed through the slot 66. When the shift lever 7 moves in the direction of arrow X in the transit gate 12, its outer peripheral surface abuts against the inner peripheral surface of the slot 66. Accordingly, the first arm potion 65a of the moving member 21 moves in the direction of arrow X along the gate 12. Also with use of the moving member 21 for selection shaped in this manner, the same effect of the first embodiment can be produced.

Figure 17:
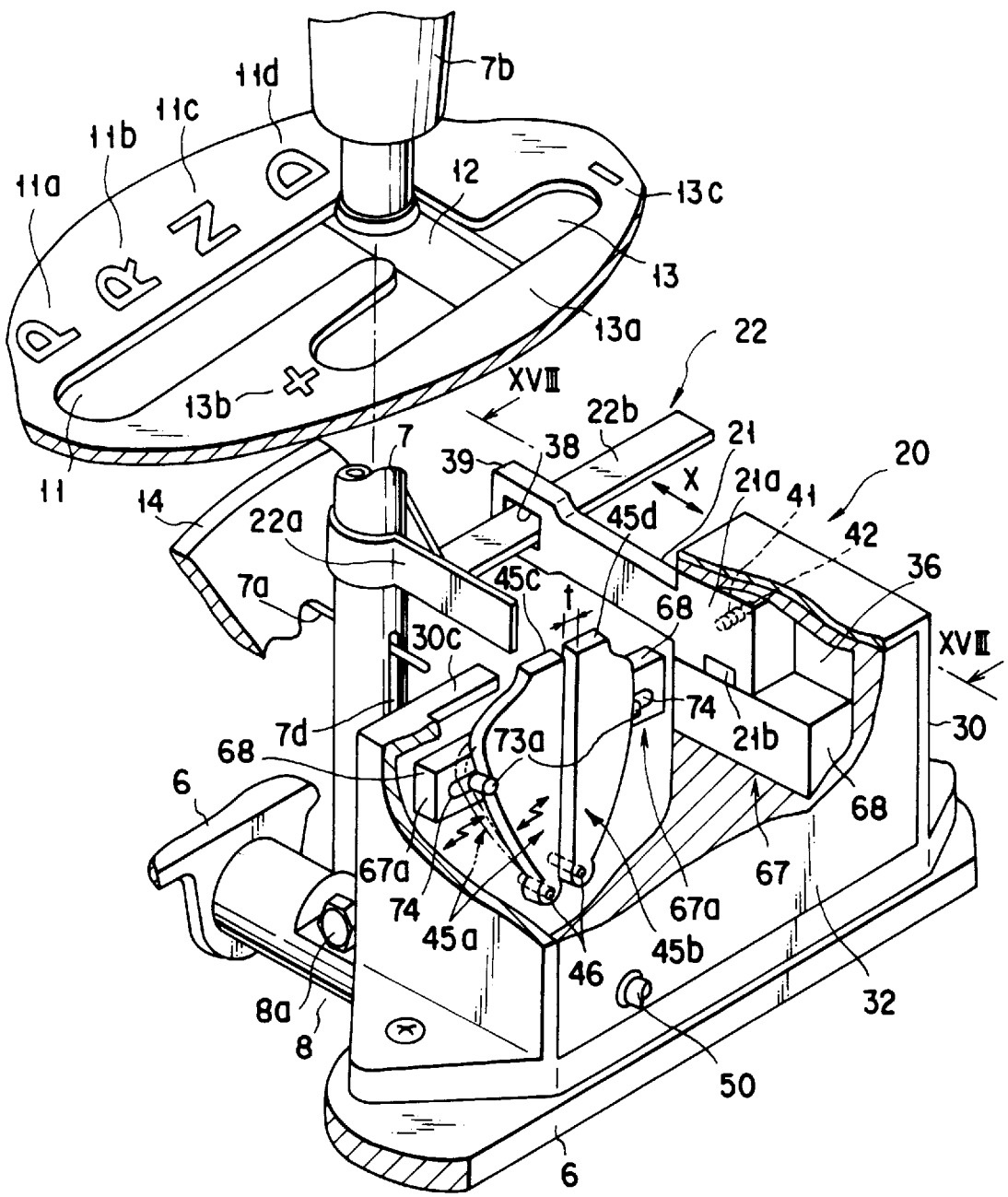
FIG. 17 is a perspective view showing a detent unit that constitutes the principal part of a fourth embodiment of the invention and mode and shift switch systems each using a module switch.
Figure 20A:
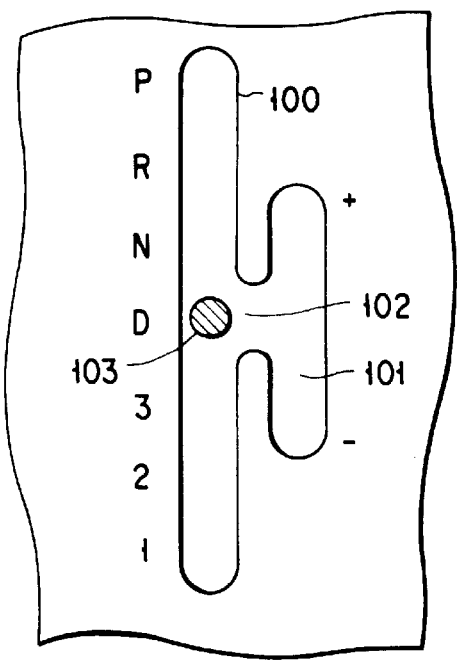
FIG. 20A is a plan view showing conventional gates for mode change.
Figure 20B:
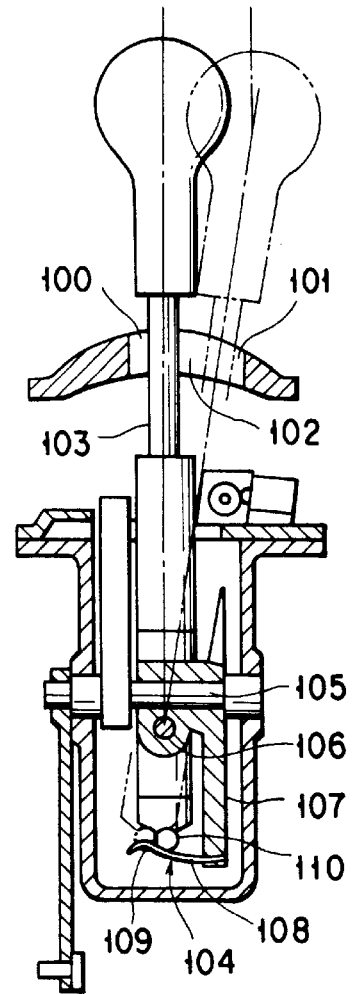
FIG. 20B is a sectional view of a conventional detent mechanism.

FIGS. 17, 18 and 19 show a fourth embodiment of the present invention. According to this embodiment, a module switch (slide switch) is used in place of the movable and fixed contacts. The moving member 21 for selection has a downward opening 21b in its proximal portion 21a. A module switch 67 is provided on the underside of the slide chamber 36. As shown in FIG. 18, the switch 67 has a container 68. Fixed contact pieces 70a, 7b and 70c are arranged on a base 69 of the container 68. The contact piece 70b is provided with a contact mount 71. A rocking contact piece 72 is rockably supported by the mount 71. The fixed piece 70a is a normally-open fixed contact piece, while the fixed piece 70c is a normally-closed fixed contact piece.

The container 68 is provided with an operating member 73, which is movable in the moving direction (indicated by arrow X) of the moving member 21 for selection. The operating member 73 is formed integrally with a cylindrical operator 73a, which extends upward from a substantially central portion of the member 73. The operator 73a projects upward through an opening 74 in the top face of the container 68. The top portion of the operator 73a is inserted in the opening 21b of the moving member 21. Since the opening 74 opens along the moving direction of the moving member 21, the operator 73a is movable in this direction. The operator 73a has a vertical through hole 73b therein. Inserted in the hole 73b are a ball 75 and a compression spring 76 for urging the ball 75 toward the rocking contact piece 72. The spring 76 is prevented from slipping out by thermally deforming a sealing projection 73c formed at the upper end of the operator 73a.

The rocking contact piece 72 has a substantially V-shaped profile such that its neutral position N1, somewhat deviated from the position in which it is supported by the contact mount 71, is depressed. The ball 75 presses the V-shaped face of the contact piece 72 from above. A compression spring 77 is provided between one side of the operating member 73 in the moving direction thereof and the side wall of the container 68 that faces the member 73. The spring 77 continually urges the operating member 73 toward the neutral position N1. When the shift lever 7 is in the automatic transmission mode, the operating member 73 is held in the neutral position N1 by means of the elastic force of the compression spring 77. When the member 73 is in the position N1, one end of the rocking contact piece 72 abuts against the normally-closed fixed contact piece 70c, thereby rendering the fixed contact piece 70a and the rocking contact piece 72 electrically nonconducting. When the shift lever 7 is shifted from the automatic transmission mode to the manual transmission mode, as indicated by two-dot chain line in FIG. 18, the moving member 21 for selection moves to the left in the slide chamber 36. In this case, the wall surface of the opening 21b engages the operating member 73, so that the member 73 slides to a left-hand position L (shown in FIG. 19), resisting the elastic force of the compression spring 77. Accordingly, the rocking contact piece 72 moves to the left, pushed by the ball 75. When the other end of the contact piece 72 touches the normally-open fixed contact piece 70a, the pieces 72 and 70a are connected electrically to each other. The transmission mode, automatic or manual, for the shift lever 7 is detected in accordance with a connection or disconnection signal from the module switch 67.

FIG. 17 shows a modification of the moving members 45a and 45b for shifting. A switch 67a similar to the module switch 67 is provided adjacent to the members 45a and 45b. When the moving members 45a and 45b rock in the longitudinal direction, a connection or disconnection signal is produced by the switch 67a. Since the module switch 67a according to this modification is constructed in the same manner as the switch 67 shown in FIGS. 18 and 19, like reference numerals are used to designate common portions, and a description of those portions is omitted. The moving members 45a and 45b and the module switch 67a shown in FIG. 17 deliver a change-up or -down signal to the transmission control device 51. The normally-closed fixed contact piece 70c may be omitted. In FIGS. 15 to 19, like reference numerals refer to common portions used in the first embodiment, and a description of those portions is omitted.

In the gearshift apparatuses according to the preferred embodiments described herein, the first and third gates 11 and 13 extend parallel to each other. However, the present invention is not limited to this arrangement, and may be also applied to any other gearshift apparatuses with the same functions in which the gates 11 and 13 are not parallel to each other. According to the foregoing embodiments, the shift lever 7 is held only in the neutral position 13a by the second retaining means, in the third gate 13 used in the manual transmission mode. Alternatively, however, the shift lever 7 may be designed so as to be held in the shift positions other than the neutral position 13a in the third gate 13, or in any of the shift positions and the neutral position. The third gate 13 used in the manual transmission mode may be designed so that three or more shift positions may be set therein, as described in Jpn. Pat. Appln. KOKAI Publication No. 3-103649. Although the third gate 13 according to the foregoing embodiments serves for the change-up and -down operations only, a plurality of transmission stages may be arranged longitudinally in the third gate 13 so that a specific stage may be set in each shift position.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

We claim:

1. A gearshift apparatus for controlling an automatic speed change gear attached to the body of a vehicle, comprising:

a shift lever rockably supported on the vehicle body;

gate means for guiding the shift lever for movement, the gate means including a first gate having a plurality of shift positions, including an automatic transmission position in which the transmission stage of the speed change gear is changed automatically in accordance with the driving conditions of the vehicle, and designed so that the transmission stage corresponding to one of the shift positions is selected when the shift lever is situated in the one shift position, a second gate having one end connected to the first gate and the other end and extending in a direction different from the extending direction of the first gate, and a third gate connected to the other end of the second gate, extending in a direction different from the extending direction of the second gate, and having shift positions for manual operation;

supporting means attached to the vehicle body;

a linkage member movably supported by the supporting means and engaged with the shift lever so as to move integrally with the shift lever when the shift lever moves along the second gate and to allow the movement of the shift lever and be restrained from moving along the second gate when the shift lever moves along the first gate or the third gate; and retaining means provided between the supporting means and the linkage member and adapted to generate a retaining force for retaining the shift lever at the one and the other end of the second gate as the shift lever moves along the second gate.

2. A gearshift apparatus according to claim 1, wherein said retaining means includes a engaging member and a recess, adapted to face each other when the shift lever is situated at the one or the other end of the second gate, and a spring for urging the engaging member toward the recess.

3. A gearshift apparatus according to claim 1, wherein said third gate has a neutral position corresponding to the other end of the second gate, a first shift position on one end side of the third gate with respect to the neutral position, and a second shift position on the other end side; and said supporting means includes second retaining means adapted to hold the shift lever in a specific position, out of the positions in the third gate, by engaging the shift lever when the shift lever moves in the third gate.

4. A gearshift apparatus according to claim 3, wherein said second retaining means includes first urging means for urging the shift lever toward the neutral position by engaging the shift lever between the neutral position (13a) and the first shift position, and second urging means for urging the shift lever toward the neutral position by engaging the shift lever between the neutral position and the second shift position.

5. A gearshift apparatus according to claim 3, wherein said second retaining means includes a pair of moving members for shifting, rockable along the third gate, and springs for urging the moving members toward each other, and said shift lever is provided with an arm for shifting insertable between the moving members for shifting.

6. A gearshift apparatus according to claim 3, wherein said supporting means includes a gearshift base attached to the vehicle body and a detent unit mounted on the base, the detent unit including shift detecting means, adapted to deliver a change-up signal when the shift lever in the third gate is moved to the first shift position and deliver a change-down signal when the shift lever is moved to the second shift position, and mode detecting means for determining whether the shift lever is in an automatic transmission mode or in a manual transmission mode in accordance with the position of the linkage member.

7. A gearshift apparatus according to claim 4, wherein said supporting means includes a gearshift base attached to the vehicle body and a detent unit mounted on the base, the detent unit including shift detecting means, adapted to deliver a change-up signal when the shift lever in the third gate is moved to the first shift position and deliver a change-down signal when the shift lever is moved to the second shift position, and mode detecting means for determining whether the shift lever is in an automatic transmission mode or in a manual transmission mode in accordance with the position of the linkage member.

8. A gearshift apparatus according to claim 1, wherein said first and third gates extends substantially parallel to each other, and said second gate extends substantially at right angles to the first and third gates.

9. A gearshift apparatus according to claim 8, wherein said linkage member is formed of a moving member for selection retained for movement along the second gate by the supporting means, the moving member having a hole extending along the first gate, and said shift lever is provided with a selecting arm extending along the first gate and inserted in the hole of the moving member for selection.

10. A gearshift apparatus according to claim 8, wherein said linkage member is formed of a moving member for selection having a first arm portion retained for movement along the second gate by the supporting means, the moving member having a slot extending in the direction of the first gate so that a selecting arm associated with the shift lever is passed vertically through the slot.

* * * * *